US012590934B2

(12) United States Patent
Wang et al.

(10) Patent No.: US 12,590,934 B2
(45) Date of Patent: Mar. 31, 2026

(54) METHOD AND SYSTEM FOR DIFFERENTIATION OF TEA TYPE

(71) Applicant: Anhui Agricultural University, Hefei (CN)

(72) Inventors: Yijun Wang, Hefei (CN); Xiaochun Wan, Hefei (CN); Zhipeng Kan, Hefei (CN); Lizhen Hu, Hefei (CN); Jingming Ning, Hefei (CN); Daxiang Li, Hefei (CN)

(73) Assignee: Anhui Agricultral University, Hefei (CN)

( * ) Notice: Subject to any disclaimer, the term of this patent is extended or adjusted under 35 U.S.C. 154(b) by 713 days.

(21) Appl. No.: 18/078,188

(22) Filed: Dec. 9, 2022

(65) Prior Publication Data

US 2023/0109241 A1     Apr. 6, 2023

Related U.S. Application Data

(63) Continuation of application No. PCT/CN2021/083770, filed on Mar. 30, 2021.

(30) Foreign Application Priority Data

Aug. 24, 2020     (CN) .......................... 202010855084.2

(51) Int. Cl.
| | |
|---|---|
| *G01N 30/86* | (2006.01) |
| *G01N 30/14* | (2006.01) |
| *G01N 30/72* | (2006.01) |

(52) U.S. Cl.
CPC ......... *G01N 30/8634* (2013.01); *G01N 30/14* (2013.01); *G01N 30/7233* (2013.01); *G01N*

*30/861* (2013.01); *G01N 30/8693* (2013.01); *G01N 30/8696* (2013.01)

(58) Field of Classification Search
None
See application file for complete search history.

(56) References Cited

FOREIGN PATENT DOCUMENTS

| | | |
|---|---|---|
| CN | 102692486 A | 9/2012 |
| CN | 104914190 A | 9/2015 |
| CN | 106885851 A | 6/2017 |

(Continued)

OTHER PUBLICATIONS

English machine translation of Lin et al. (CN 110503003 A) (Year: 2019).*

(Continued)

*Primary Examiner* — Walter L Lindsay, Jr.
*Assistant Examiner* — Geoffrey T Evans
(74) *Attorney, Agent, or Firm* — IPRO, PLLC; Na Xu

(57) ABSTRACT

Disclosed are a tea type differentiation method and system, belonging to the technical field of detection. The method comprises: building a differentiation function by using ionic strengths of 20 compounds as evaluation indexes to discriminate tea types. According to the disclosure, the tea types are discriminated by using relative abundance of 20 compounds in tea, problems in sensory differentiation can be solved, the tea is classified more objectively and scientifically, and the reliability and accuracy of differentiation results are improved. By using three algorithms, the feasibility and accuracy of using 20 discovered compounds for tea type differentiation in a combined manner are validated.

16 Claims, 22 Drawing Sheets

(56)                References Cited

FOREIGN PATENT DOCUMENTS

| CN | 107132267 | A | | 9/2017 | | |
|----|-----------|---|---|--------|---|---|
| CN | 108717078 | A | | 10/2018 | | |
| CN | 108760870 | A | | 11/2018 | | |
| CN | 110503003 | A | * | 11/2019 | .............. | G06N 3/08 |
| CN | 112014516 | A | | 12/2020 | | |
| KR | 20110051983 | A | | 5/2011 | | |

OTHER PUBLICATIONS

English machine translation of Wang et al. (CN 108717078 A) (Year: 2018).*

* cited by examiner

METHOD AND SYSTEM FOR DIFFERENTIATION OF TEA TYPE

TECHNICAL FIELD

The disclosure relates a method and system for differentiation of tea type, and belongs to the technical field of detection.

BACKGROUND

Tea trees are perennial evergreen leaf plants, and belong to Camellia of Theaceae. Tea, prepared from fresh tea leaves by different processing methods, is rich in functional chemical ingredients such as polyphenols, amino acids and alkaloids. According to different processing technologies, quality characteristics and appearance differences, the tea is divided into six major types including green tea, yellow tea, dark green tea, white tea, oolong tea and black tea by a traditional tea classification method.

At present, the tea type is mainly discriminated through sensory evaluation combined with dry and wet evaluation, and the appearance, color, tenderness and clarity of dry tea, as well as the aroma, taste, soup color and infused leaf of tea soup after tea brewing are evaluated. Traditional sensory evaluation needs professional personnel, requires high technical and working experience of evaluation personnel, and is easily affected by factors such as physiological conditions of evaluation personnel and environment, the individual subjectivity is too strong, and the tea types cannot be accurately discriminated. With the development of science and technology, various instrumental analysis and detection methods appear, so that the identification, quality control and quality safety of the tea become more reliable. In order to overcome the defects of sensory evaluation, some people at present try classifying the tea by technologies of near infrared spectrums, electronic noses, electronic tongues, liquid chromatography, gas chromatography, combined gas chromatography mass spectrometry, etc. However, these methods have some shortcomings, such as complicated sample pretreatment, long time consumption, complicated steps, etc. In addition, the methods and techniques capable of being used for discriminating six tea types at the same time are lack, and the differentiation accuracy of all tea types cannot reach high at the same time.

SUMMARY

The disclosure provides a tea type differentiation method and system. The tea types are discriminated by using relative abundance of 20 compounds in tea, problems in sensory differentiation can be solved, the tea is classified more objectively and scientifically, and the reliability and accuracy of differentiation results are improved. By using three algorithms, the feasibility and accuracy of using 20 discovered compounds for tea type differentiation in a combined manner are validated.

The disclosure provides a tea type differentiation method, including building a differentiation function by using ionic strengths of 20 characteristic compounds as evaluation indexes to discriminate tea types. Mass-to-charge ratios of the 20 compounds are as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-

537.3302, 554.1509-554.2063, 579.1207-579.1786, 607.2611-607.3218, 677.3378-677.4055, 744.2234-744.2978, and 869.1124-869.1993.

In an embodiment of the disclosure, the method specifically includes:
  (1) performing preprocessing on tea samples, wherein the preprocessing includes grinding the tea samples into powder, performing centrifugation to obtain a supernatant, and setting an internal standard;
  (2) detecting the tea samples to obtain each group of data matrixes including peak area, retention time and mass-to-charge ratio information of each of the samples, performing internal standard normalization by respectively dividing an ionic response intensity value of an obtained compound peak by an internal standard compound ionic response intensity value, and performing variable selection through OPLS-DA (Orthogonal Partial Least-Squares Discriminant Analysis) and stepwise discriminant analysis to obtain 20 characteristic compounds;
  (3) building three-mathematical-method-based tea type differentiation models by using internal standard normalization ionic response intensity values of the 20 compounds obtained from the tea samples; and
  (4) putting the internal standard normalization ionic response intensity values of the 20 compounds in tea samples to be discriminated into the built tea type differentiation models to obtain the types of the tea samples to be discriminated.

In an embodiment of the disclosure, before the putting the internal standard normalization ionic response intensity values of the tea samples to be discriminated into the different built tea type differentiation models, the method further includes: collecting tea samples of each type, preprocessing and detecting the samples, processing and analyzing obtained data, and obtaining the internal standard normalization ionic response intensity values of the 20 compounds of the samples between the set mass-to-charge ratios.

In an embodiment of the disclosure, for the 20 obtained compounds, different tea type sample data is subjected to OPLS-DA, and then, variables with VIP (Variable Importance in Projection) values greater than 1.5 are selected as candidate variables. For further simplifying the variables, the candidate variables are further selected by a stepwise discriminant analysis method to finally obtain 16 compounds. In combination with practical application conditions where it is discovered that green tea and yellow bud tea are easy to wrongly discriminate, in order to avoid potential differentiation rate reduction caused by sample increase in practical application, some characteristic variables beneficial to green tea and yellow bud tea differentiation are considered to be added. Through a parameter of FC (Fold Change) introduced, compound variables with FC>2, FC<0.5 and high ironic response intensity between green tea and yellow bud tea are selected, and 4 compounds are finally obtained through selection. The compounds obtained through twice selection are aggregated to finally obtain 20 compounds for discriminating different tea types.

In an embodiment of the disclosure, three mathematical methods for building the tea type differentiation models include a random forest method, a support vector machine method or a Fisher differentiation method.

In an embodiment of the disclosure, the building different tea type differentiation models further includes: using data of the internal standard normalization ionic response intensity values of 20 compounds of different types of collected tea samples between the set mass-to-charge ratios as a data set of sample tea; and randomly dividing the data set of the sample tea into a training set and a validation set. Data of the training set is used for building the tea type differentiation models, data of the validation set is used for validating the built tea type differentiation models, and a ratio of the quantity of the sample tea samples of each tea type to the quantity of the tea samples to be discriminated is not smaller than 3:1.

In an embodiment of the disclosure, according to the different built tea type differentiation models, the tea samples to be discriminated (validation set) are detected to obtain data of the internal standard normalization ionic response intensity values of 20 compounds between the set mass-to-charge ratios, the data is put into the built tea type differentiation models to obtain a classification result of the tea samples to be discriminated.

In an embodiment of the disclosure, the tea types include one or more of green tea, yellow tea, dark green tea, white tea, black tea and oolong tea.

The disclosure further provides a tea classification system, including:

a sampling module, configured to obtain tea mass spectrometric data corresponding to tea to be discriminated by using an LC-MS (Liquid Chromatography-Mass Spectrometry) technology;

a classification module, configured to build a differentiation function by using ironic intensities of 20 characteristic compounds as evaluation indexes to perform classification processing on the obtained tea mass spectrometric data for obtaining a classification result of the tea to be discriminated, mass-to-charge ratios of the 20 compounds being as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-537.3302, 554.1509-554.2063, 579.1207-579.1786, 607.2611-607.3218, 677.3378-677.4055, 744.2234-744.2978, and 869.1124-869.1993.

In an embodiment of the disclosure, the system further includes a model building module configured to build tea classification models, and the model building module specifically includes:

a model building data obtaining submodule, configured to obtain sample tea mass spectrometric data corresponding to different types of sample tea and use a data set formed by the obtained sample tea mass spectrometric data as a sample tea mass spectrometric data set;

a model building processing submodule, configured to randomly divide the obtained sample tea mass spectrometric data into a training set and a validation set, and perform model building processing on the training set by using a random forest method, a support vector machine method or a Fisher differentiation method to build and obtain tea type differentiation models; and a validation submodule, configured to validate a random forest model by using the validation set.

The disclosure further provides an automatic tea separation device, including the tea classification system described above.

The Disclosure has the Following Beneficial Effects

According to the disclosure, the tea types are discriminated by using relative abundance of 20 compounds in tea, problems in sensory differentiation can be solved, the tea is classified more objectively and scientifically, the differentiation accuracy reaches 100%, and the reliability and accuracy of differentiation results are improved. By using three algorithms, the feasibility and accuracy of using 20 discovered compounds for tea type differentiation in a combined manner are validated.

DETAILED DESCRIPTION

Exemplary examples of the disclosure are illustrated hereafter. It should be understood that the examples are used for better explaining the disclosure rather than limiting the disclosure.

Example 1: Tea Type Differentiation Method

This example provides a tea type differentiation method based on chemical ingredients, specifically including five steps of collection and preprocessing of tea samples to be discriminated, detection platform selection and platform environment setting (LC-MS detection), data acquisition and data preprocessing, and tea type differentiation.

Step 1: Sample collection and preprocessing: 126 tea type samples of six types on the market were collected. The samples were ground into powder after freezing drying. 50 mg of each tea sample was precisely weighed, and 800 μL of 70% methanol was added. Vortex shaking was performed. Ultrasonic processing was performed for 20 min. Centrifugation was performed at 12,000 g for 15 min at 4° C. A supernatant and an internal standard (DL-4-chlorophenyl-alanine methanol solution) were sucked and put into a sample bottle for detection.

Step 2: Sample detection: The tea samples processed in Step 1 were detected through LC-MS. The chromatographic conditions were as follows: a Hypersil Gold chromatographic column was used, a mobile phase was 0.1% formic acid water (phase A)-0.1% formic acid-containing acetonitrile (phase B), gradient elution (0-2 min, 5-40% B; 2-7 min, 40-80% B; 7-11 min, 80-95% B; and 11-15 min, 95% B) was performed, a column temperature was 35° C., a flow rate was 0.3 mL/min, and an injection volume was 4 μL. The mass spectrometry conditions were as follows: a Q Exactive high-resolution combination mass spectrometry system was used, a capillary temperature was 350° C., a capillary voltage was 3.8 kV, and a collection mass range was m/z: 50 to 1000.

Step 3: Data acquisition and data preprocessing: Acquired data was subjected to peak recognition and peak integration by using Compounds Discoverer 2.0 software. Then, each group of obtained data was subjected to retention time correction, peak alignment, background deduction and deconvolution analysis to obtain each group of peak area, retention time and mass-to-charge ratios of each sample. In order to eliminate errors between samples of different batches, all peaks obtained through extraction were subjected to normalization processing. The normalization processing specifically included an operation of respectively dividing the peak area of each compound by the peak area of the internal standard compound.

Figure 1:
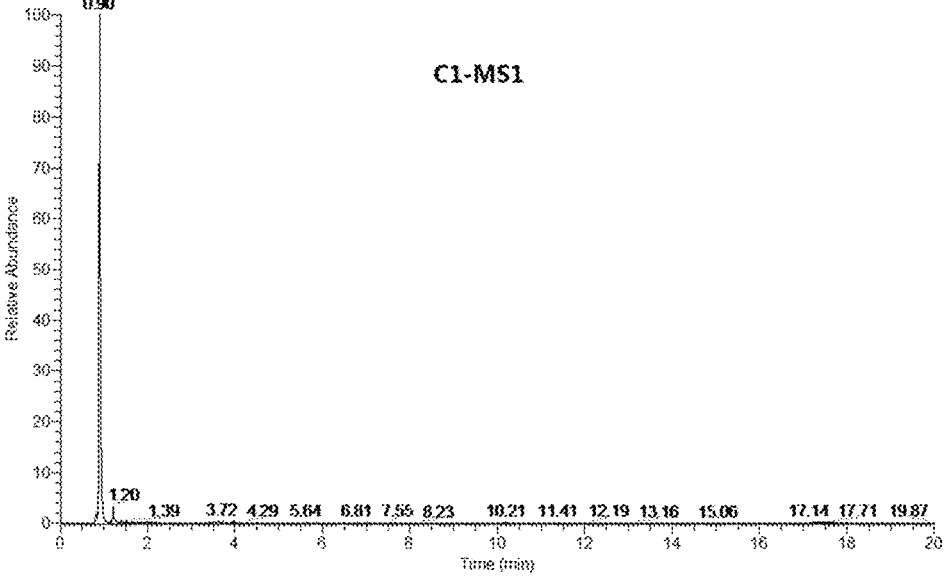
FIG. 1 is MS1 and MS2 mass spectrums of a compound C1 in Table 1.
Figure 1:
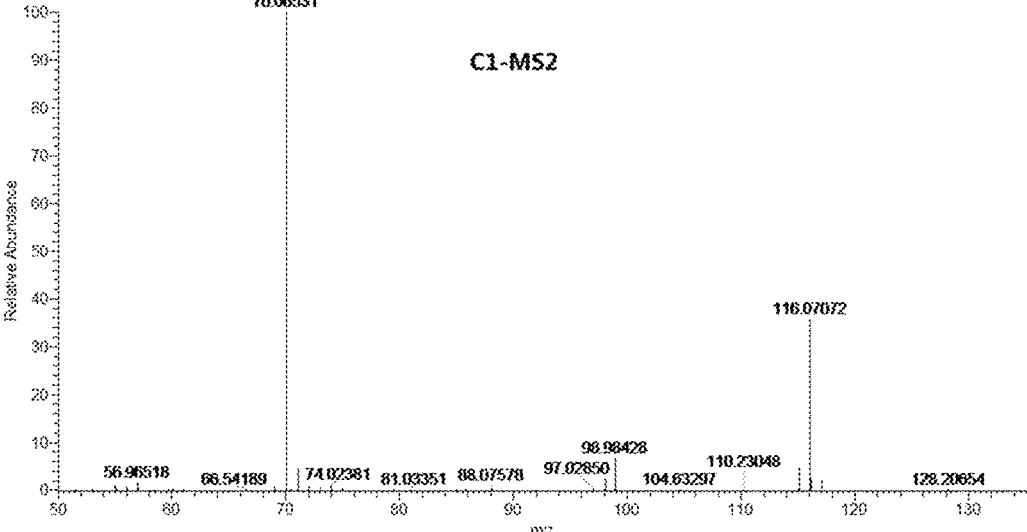
Figure 2:
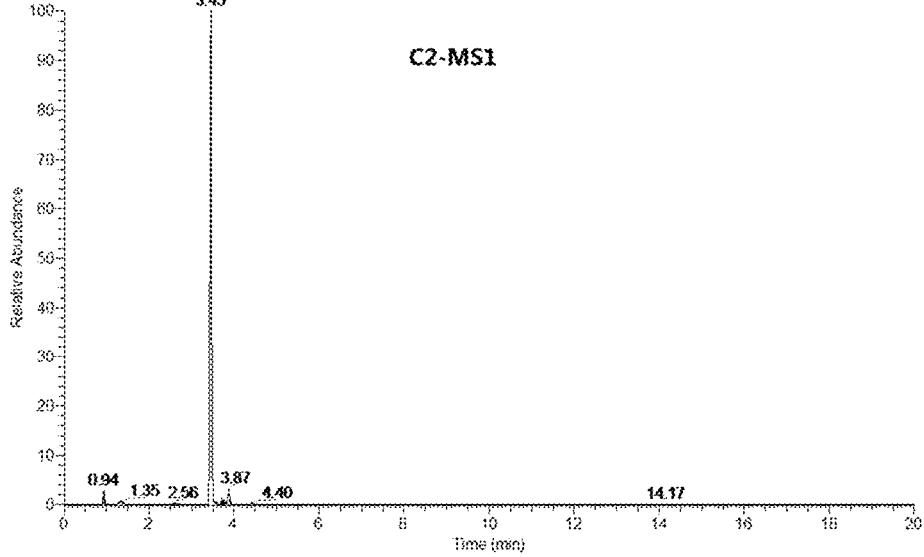
FIG. 2 is MS1 and MS2 mass spectrums of a compound C2 in Table 1.
Figure 2:
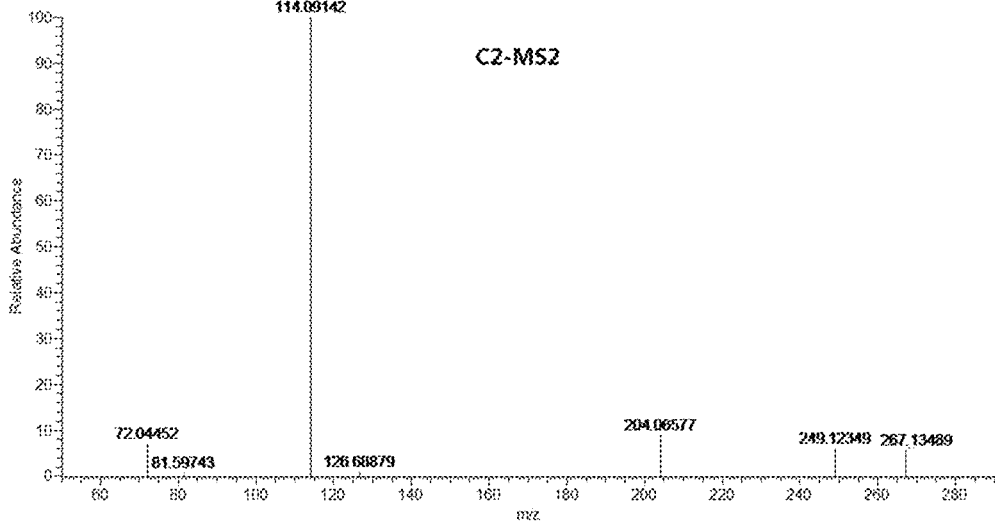
Figure 3:
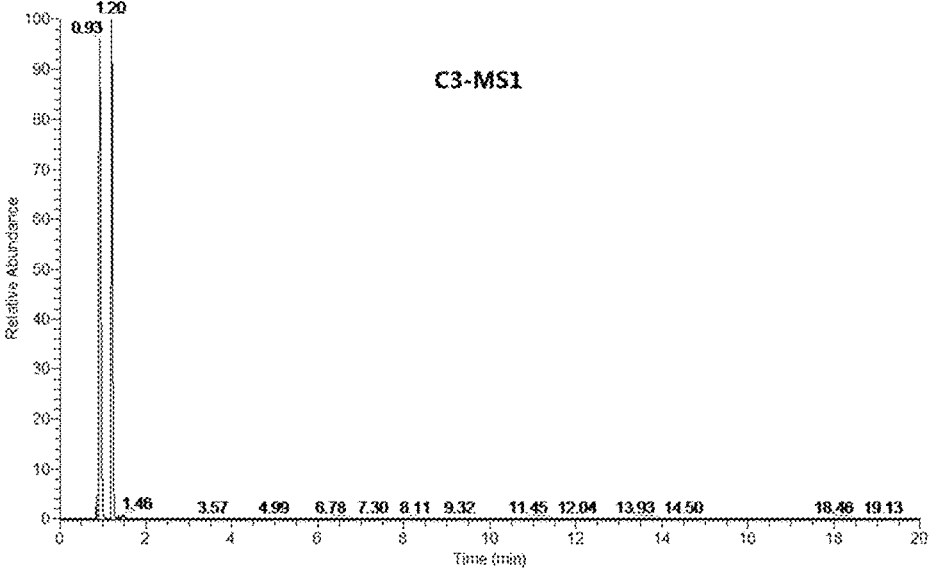
FIG. 3 is MS1 and MS2 mass spectrums of a compound C3 in Table 1.
Figure 3:
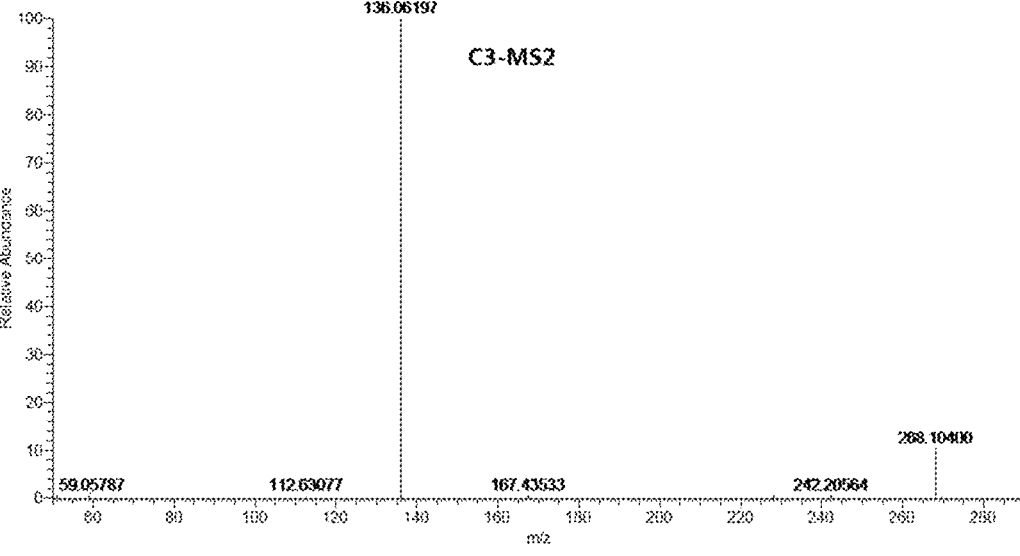
Figure 4:
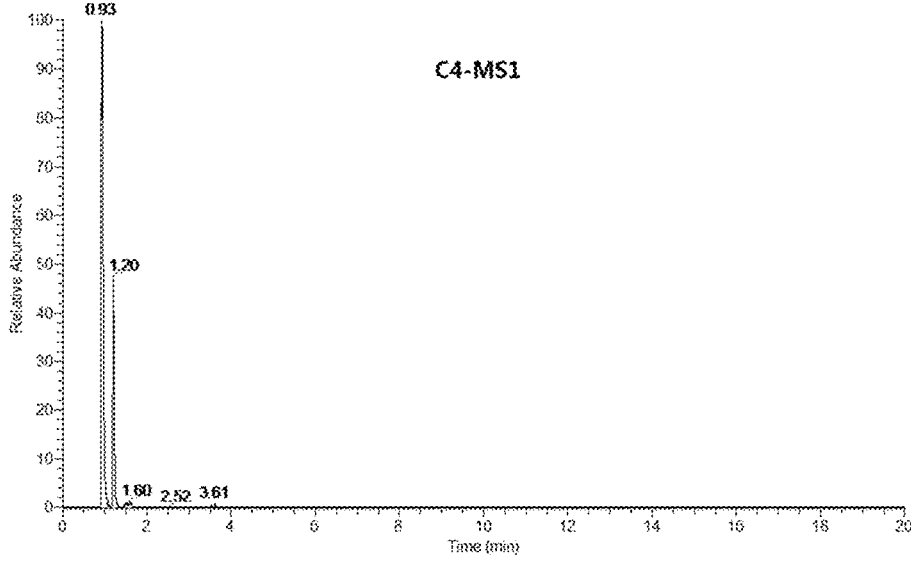
FIG. 4 is MS1 and MS2 mass spectrums of a compound C4 in Table 1.
Figure 4:
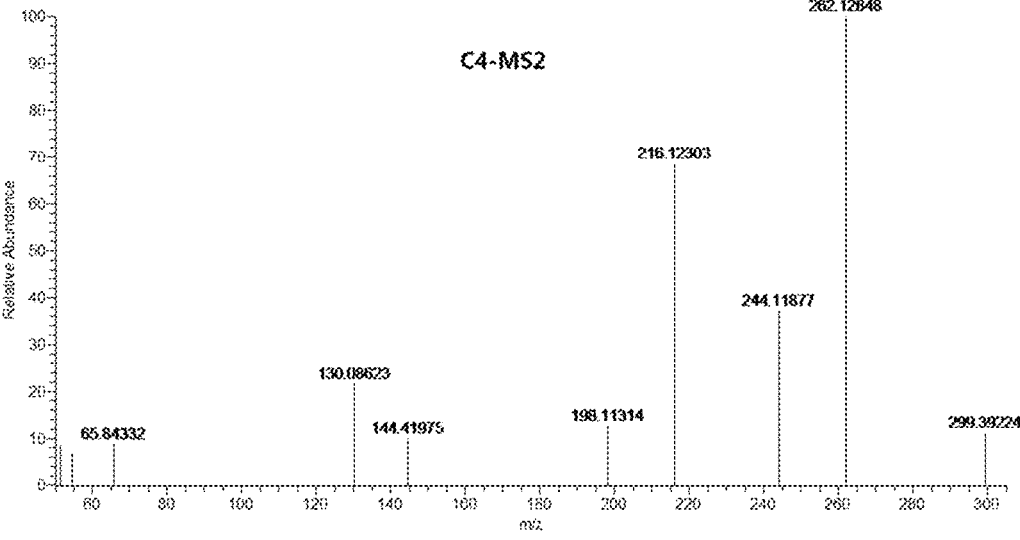
Figure 5:
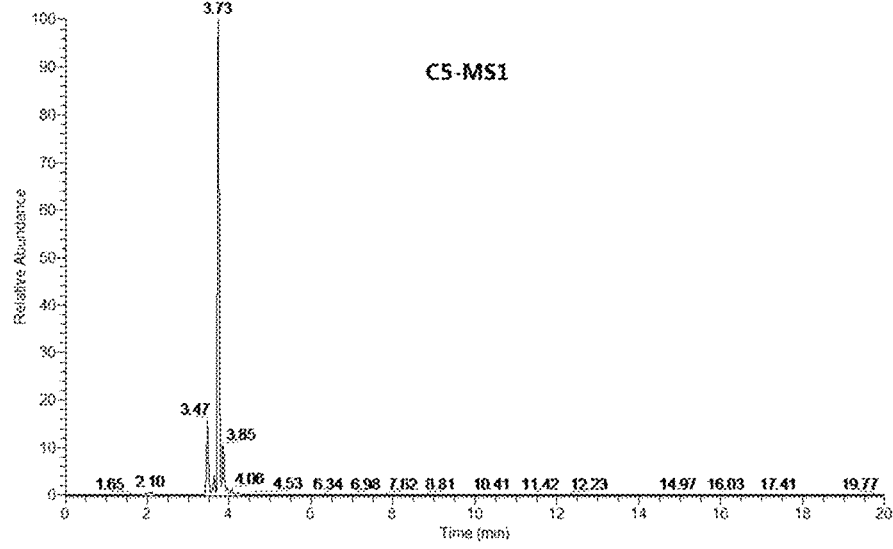
FIG. 5 is MS1 and MS2 mass spectrums of a compound C5 in Table 1.
Figure 5:
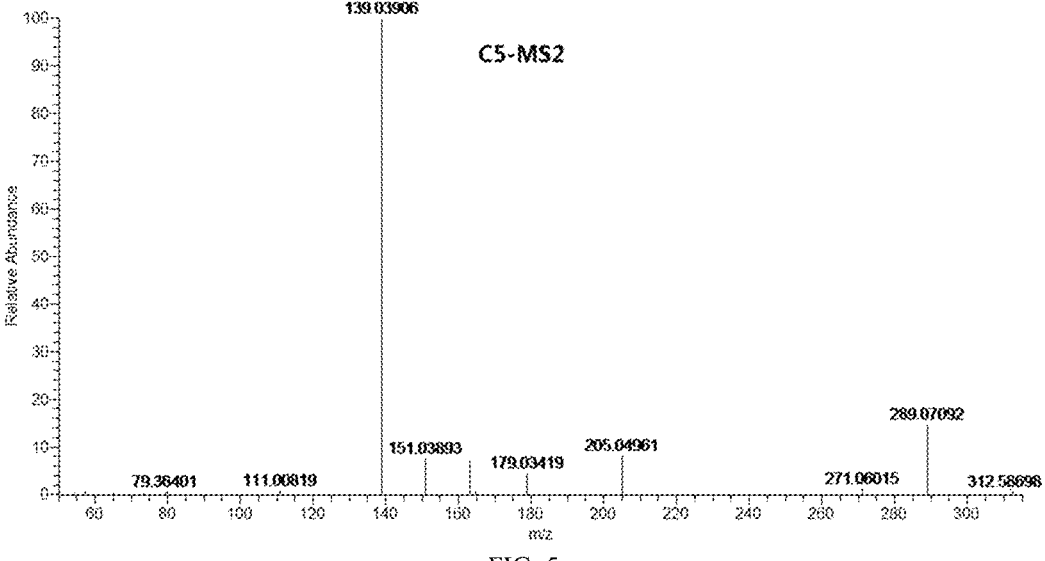
Figure 6:
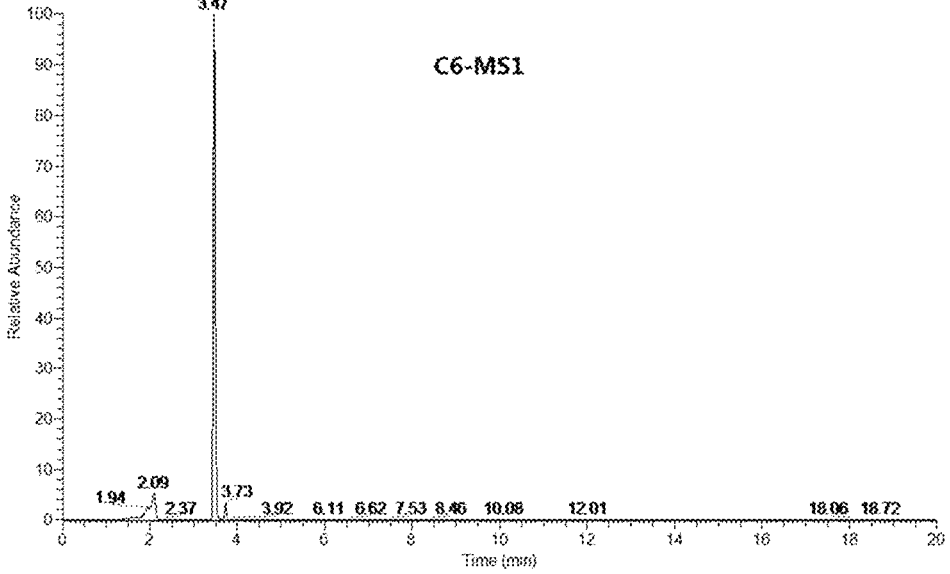
FIG. 6 is MS1 and MS2 mass spectrums of a compound C6 in Table 1.
Figure 6:
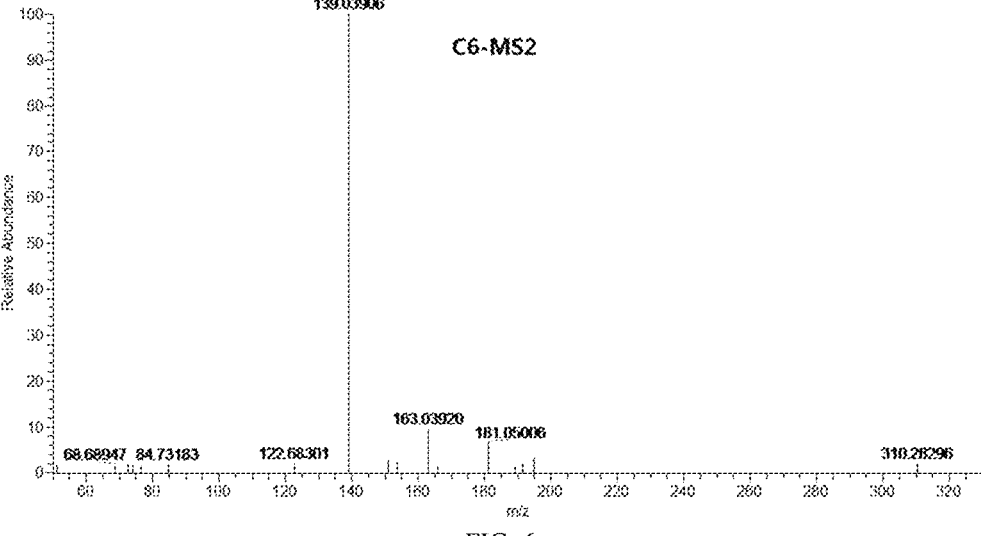
Figure 7:
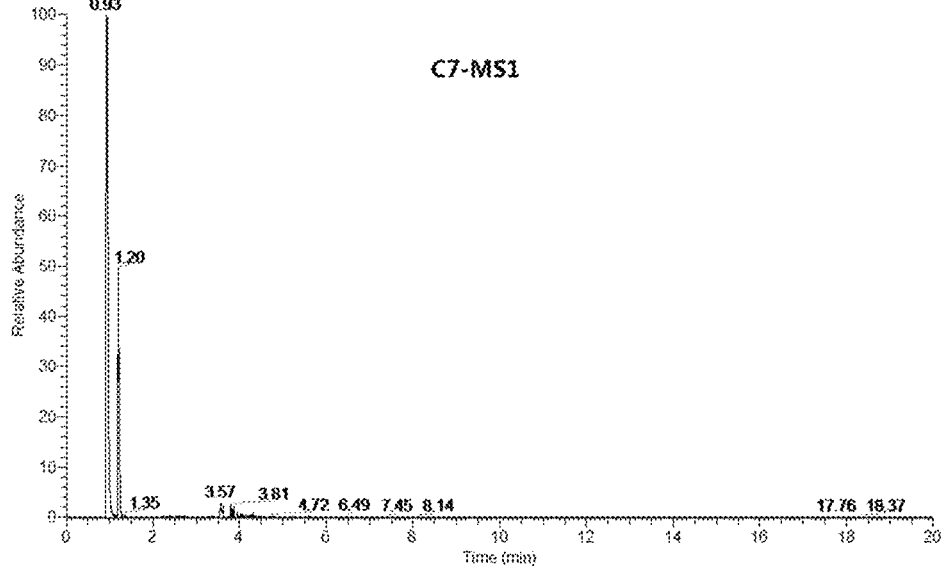
FIG. 7 is MS1 and MS2 mass spectrums of a compound C7 in Table 1.
Figure 7:
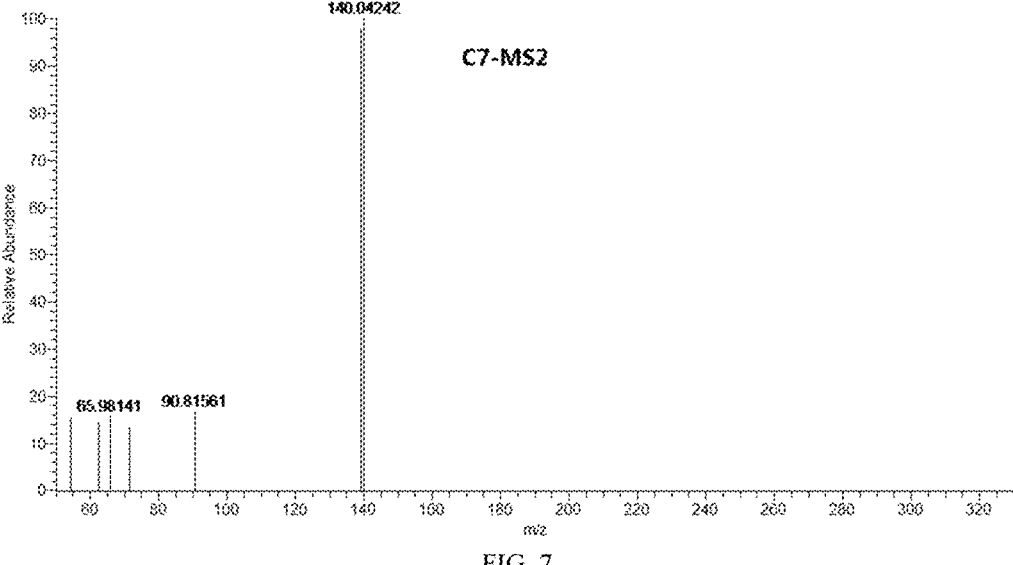
Figure 8:
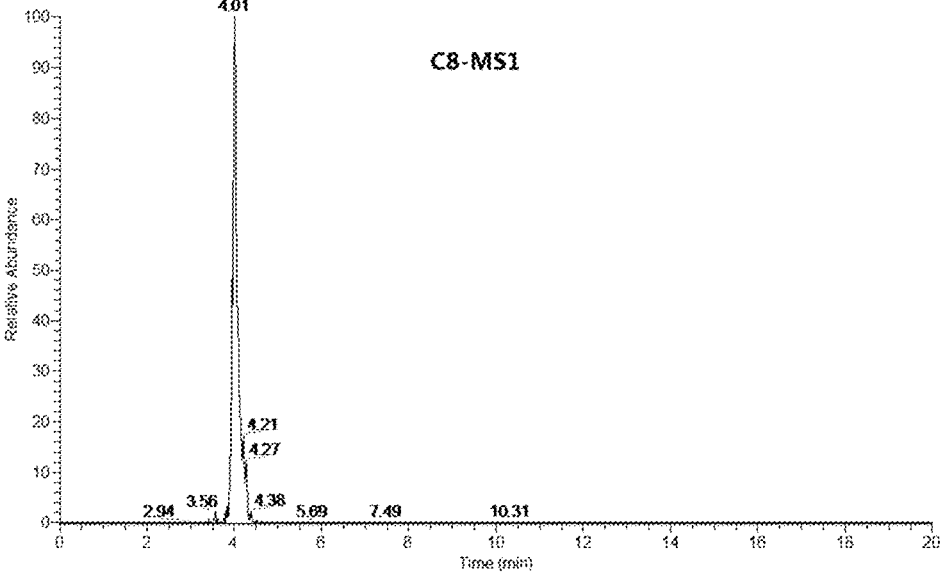
FIG. 8 is MS1 and MS2 mass spectrums of a compound C8 in Table 1.
Figure 8:
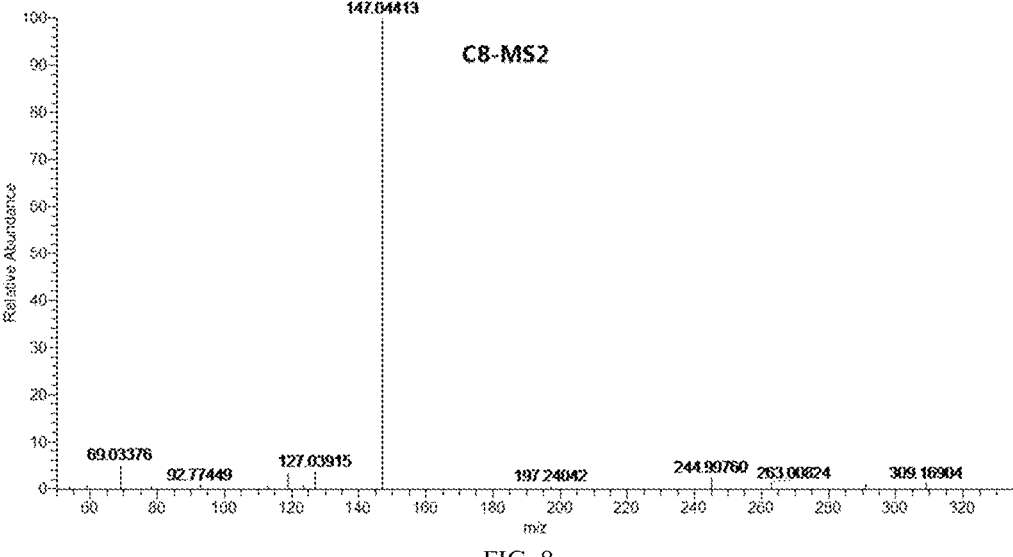
Figure 9:
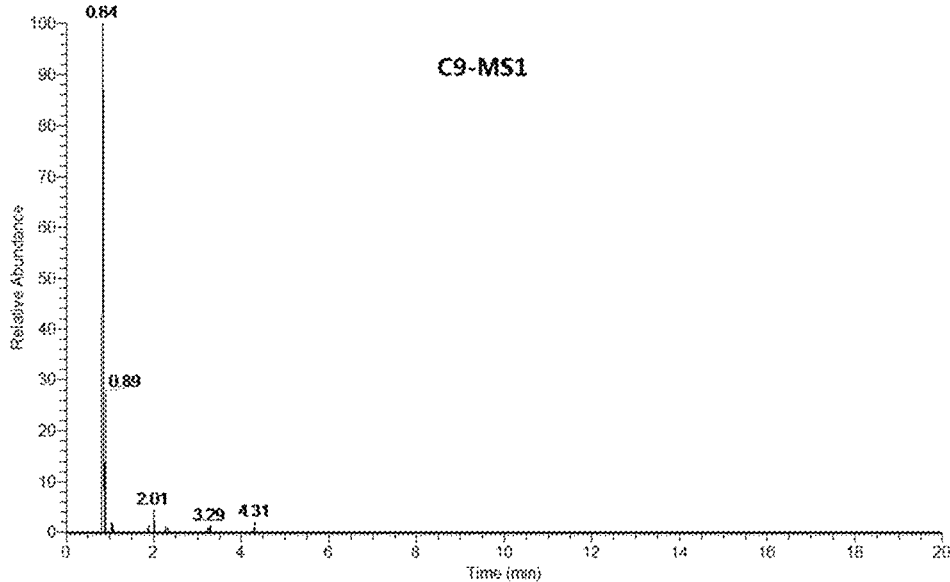
FIG. 9 is MS1 and MS2 mass spectrums of a compound C9 in Table 1.
Figure 9:
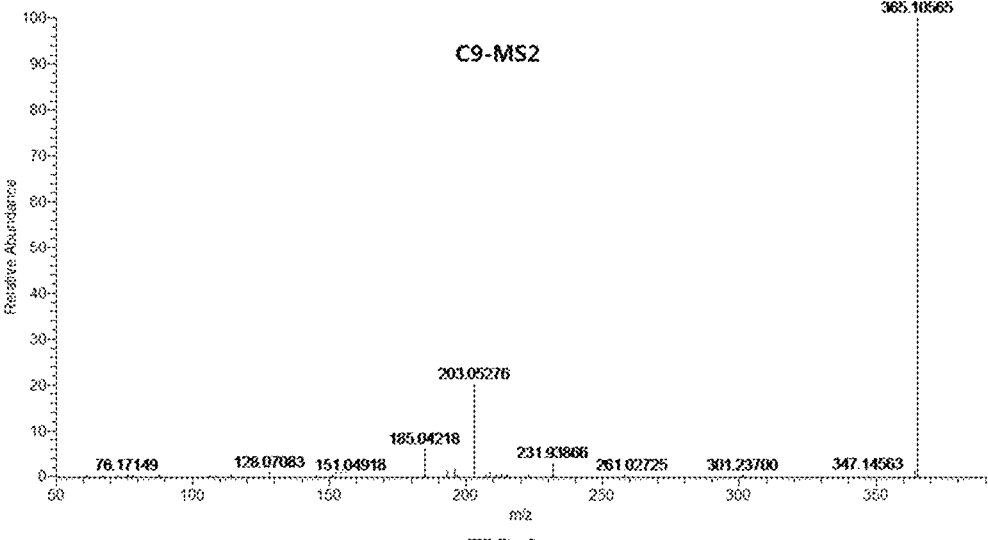
Figure 10:
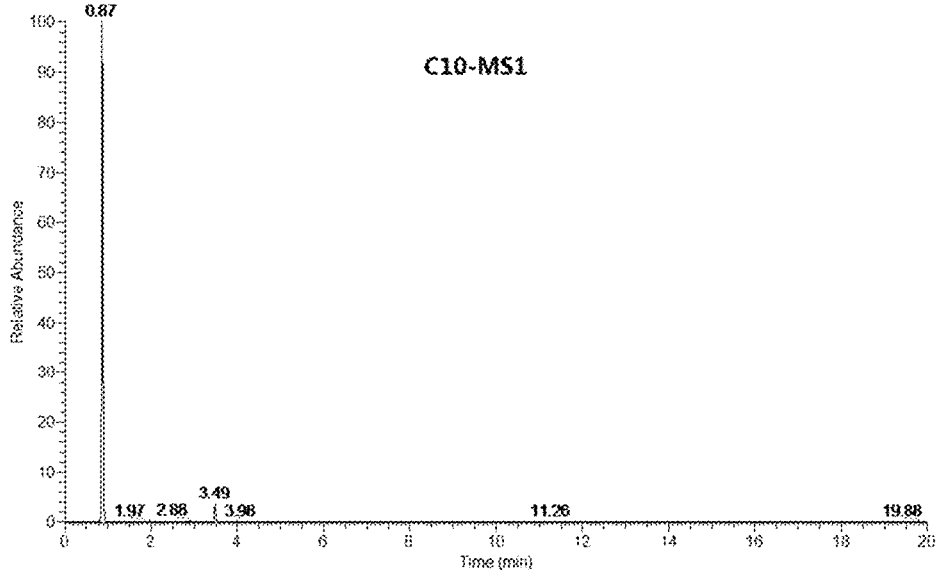
FIG. 10 is MS1 and MS2 mass spectrums of a compound C10 in Table 1.
Figure 10:
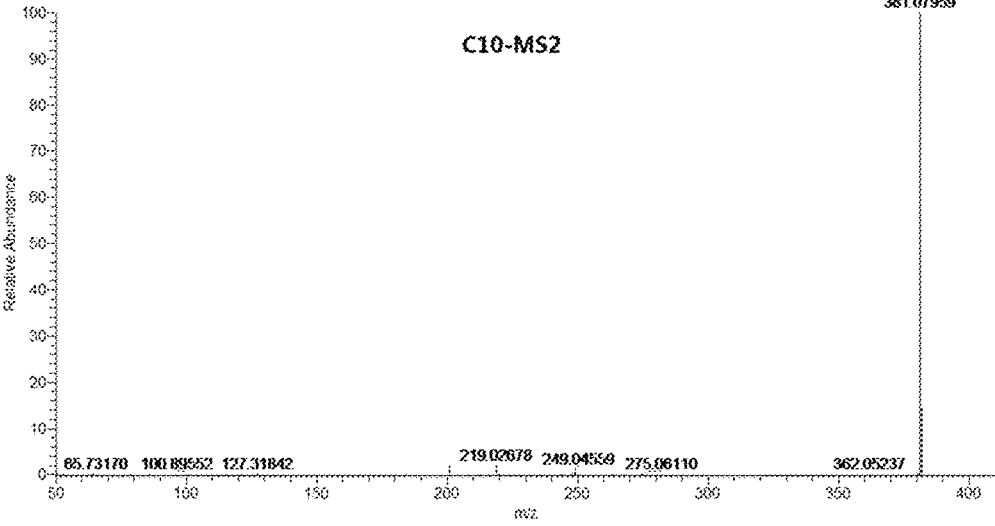
Figure 11:
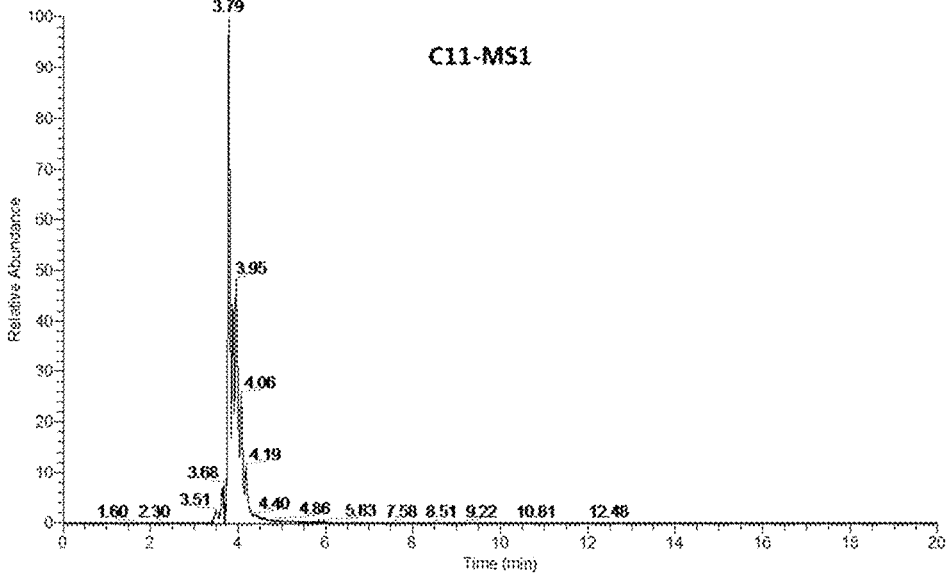
FIG. 11 is MS1 and MS2 mass spectrums of a compound C11 in Table 1.
Figure 11:
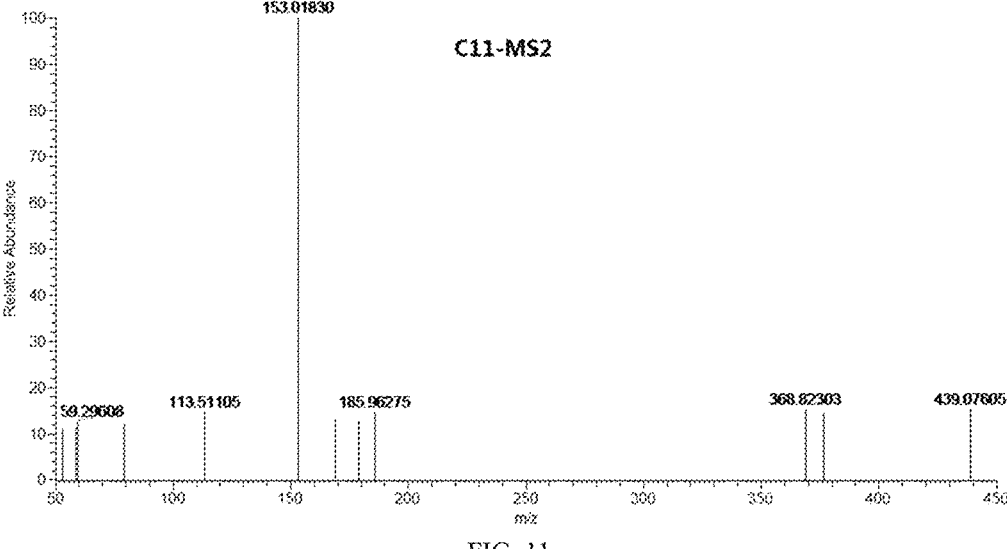
Figure 12:
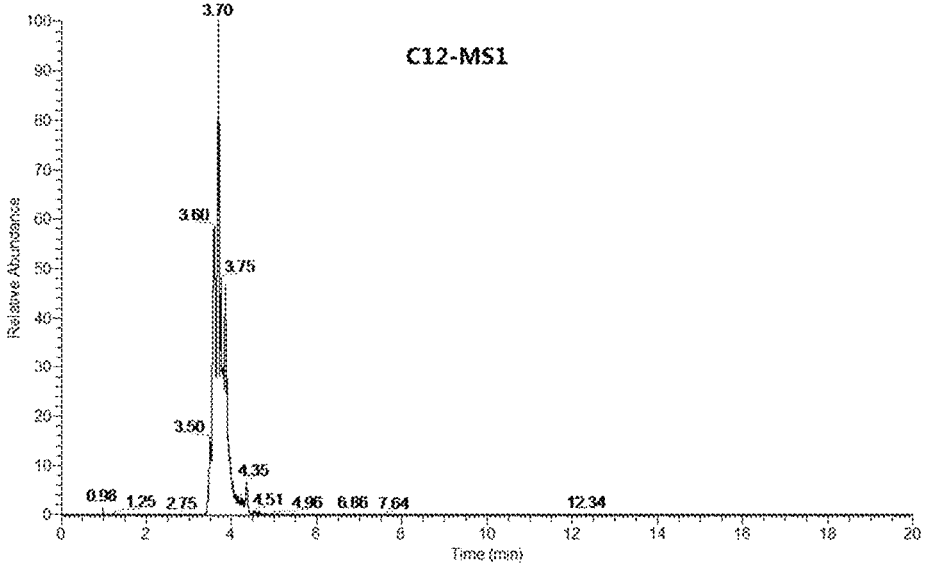
FIG. 12 is MS1 and MS2 mass spectrums of a compound C12 in Table 1.
Figure 12:
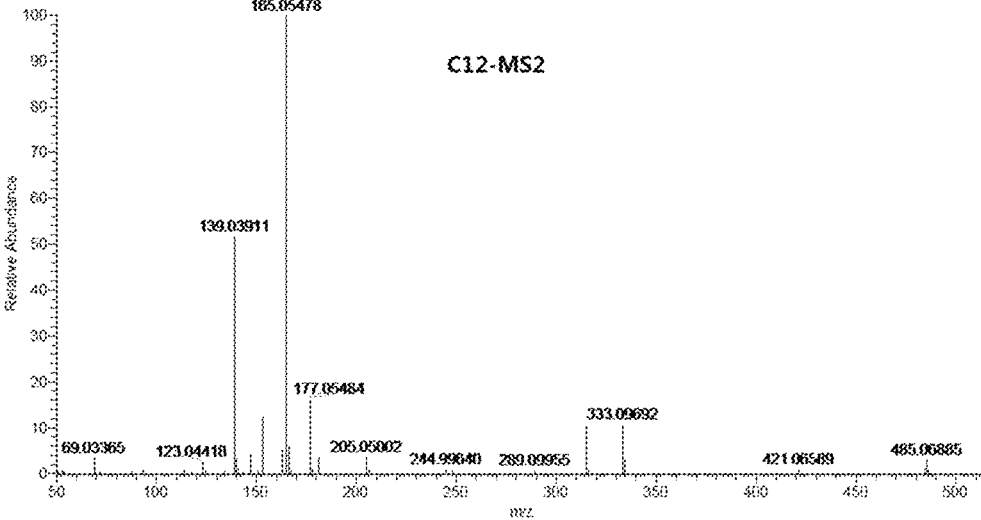
Figure 13:
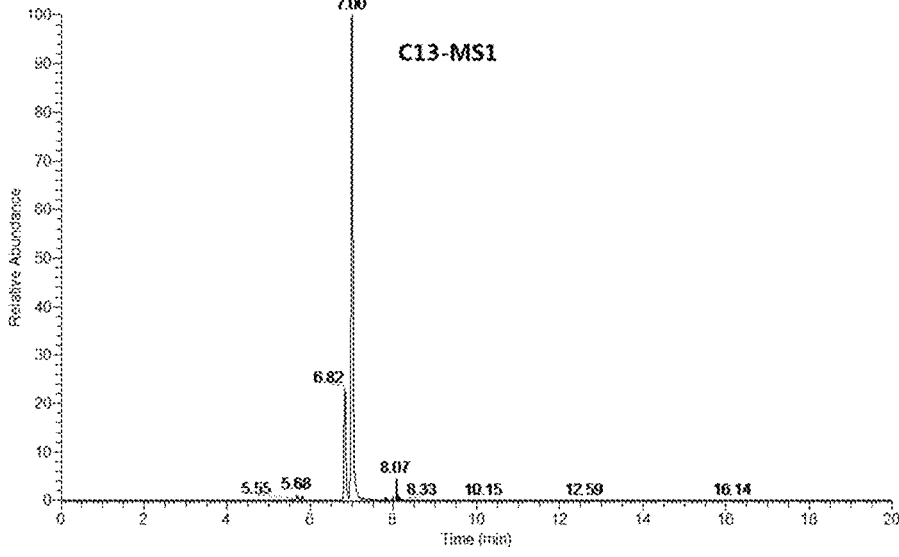
FIG. 13 is MS1 and MS2 mass spectrums of a compound C13 in Table 1.
Figure 13:
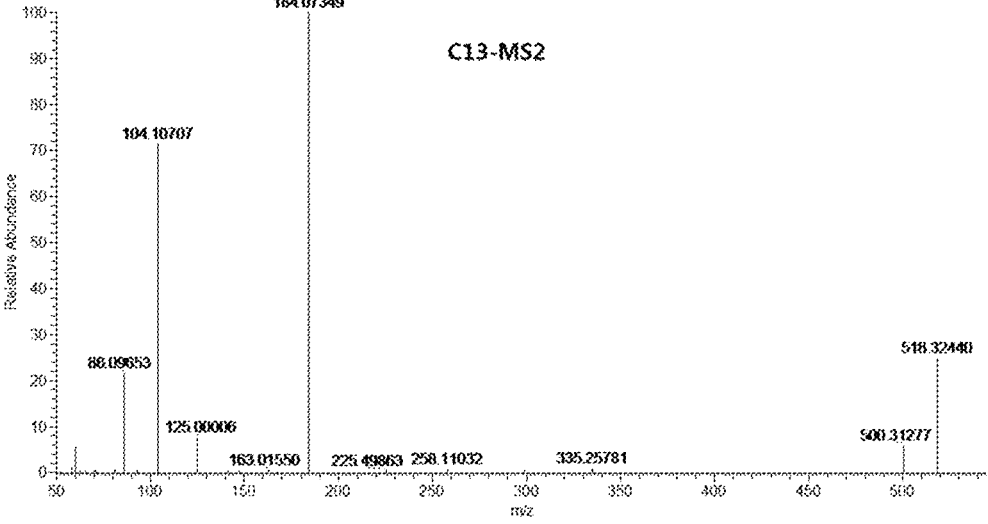
Figure 14:
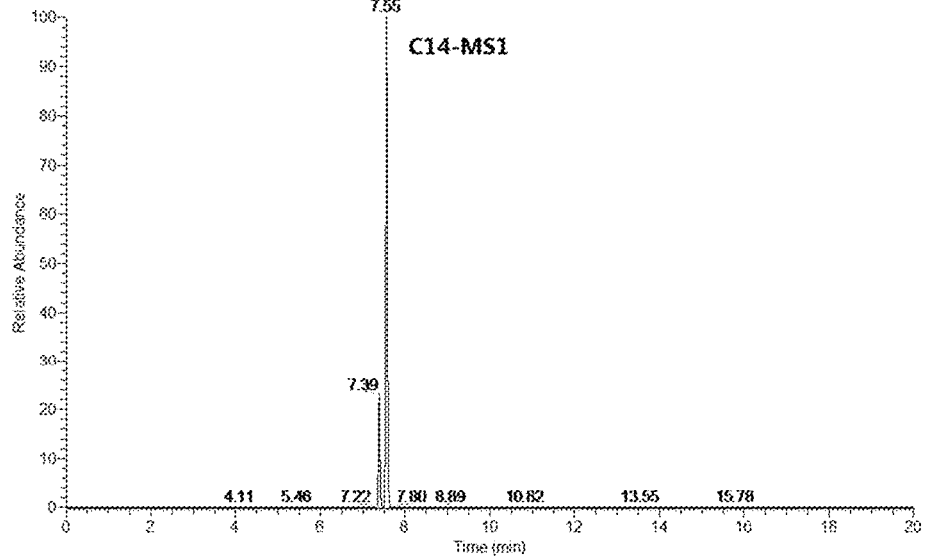
FIG. 14 is MS1 and MS2 mass spectrums of a compound C14 in Table 1.
Figure 14:
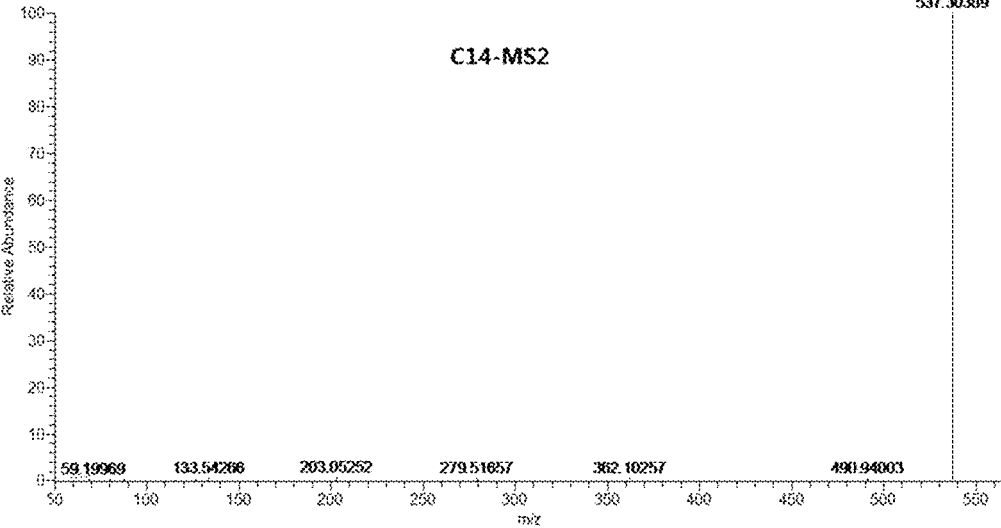
Figure 15:
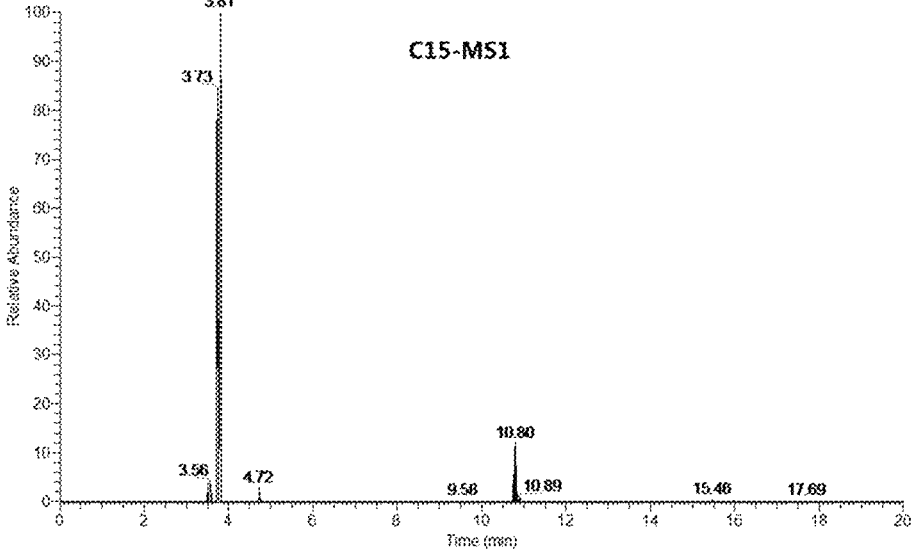
FIG. 15 is MS1 and MS2 mass spectrums of a compound C15 in Table 1.
Figure 15:
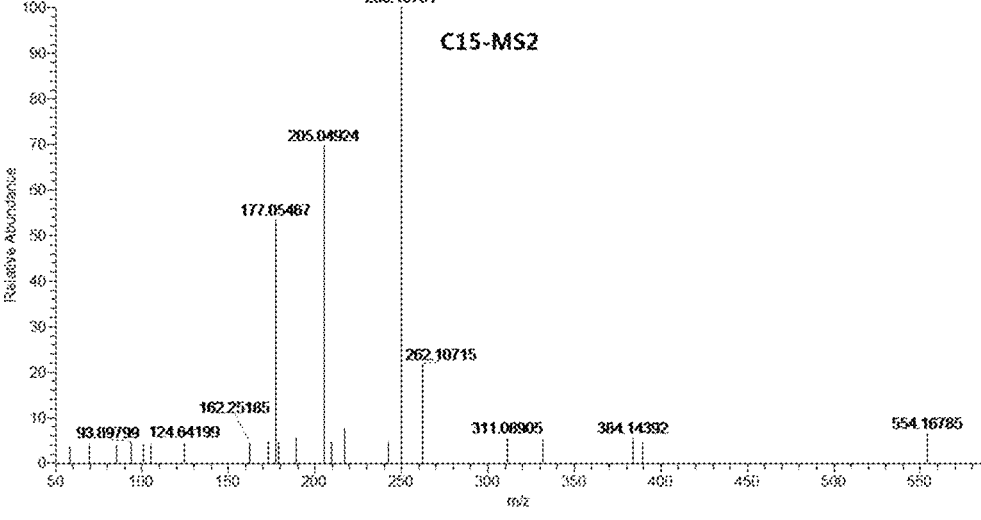
Figure 16:
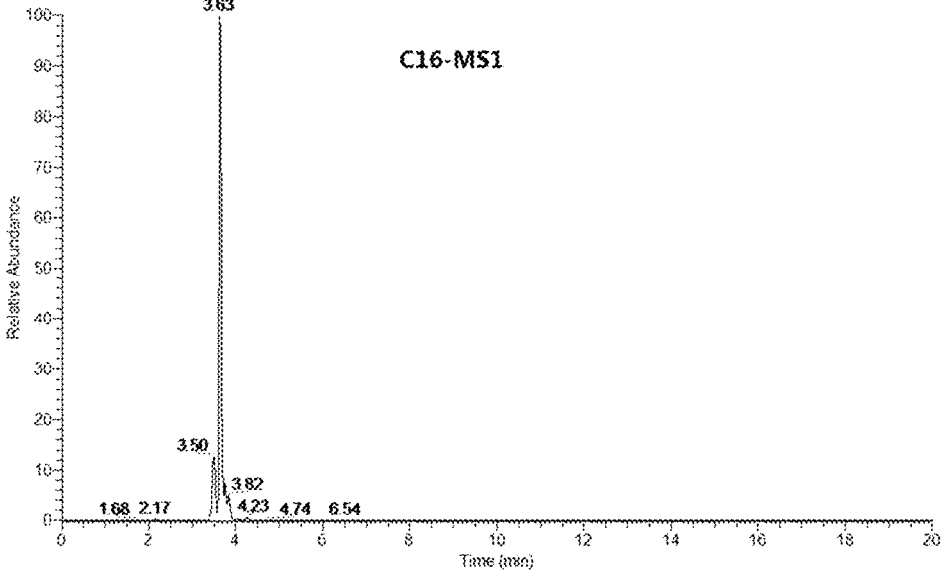
FIG. 16 is MS1 and MS2 mass spectrums of a compound C16 in Table 1.
Figure 16:
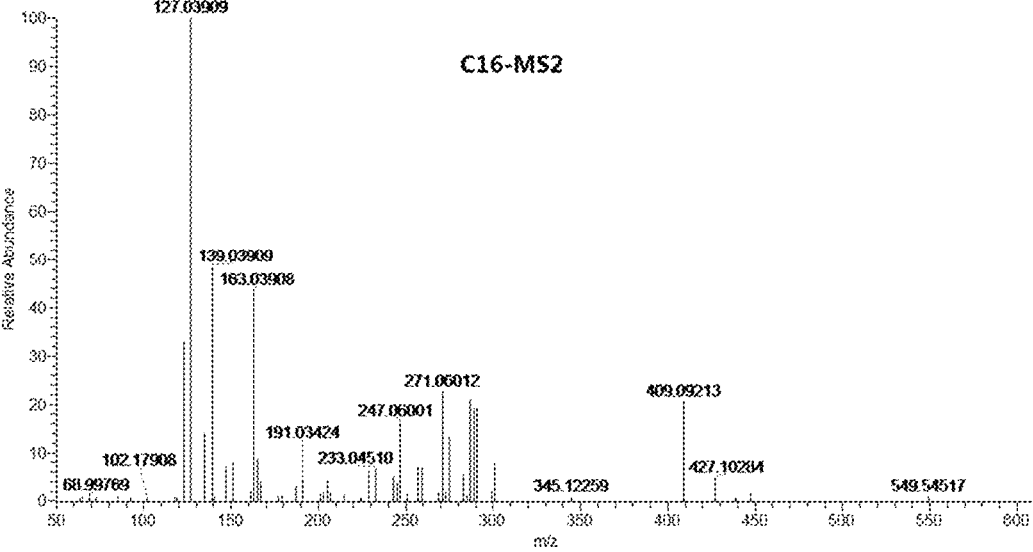
Figure 17:
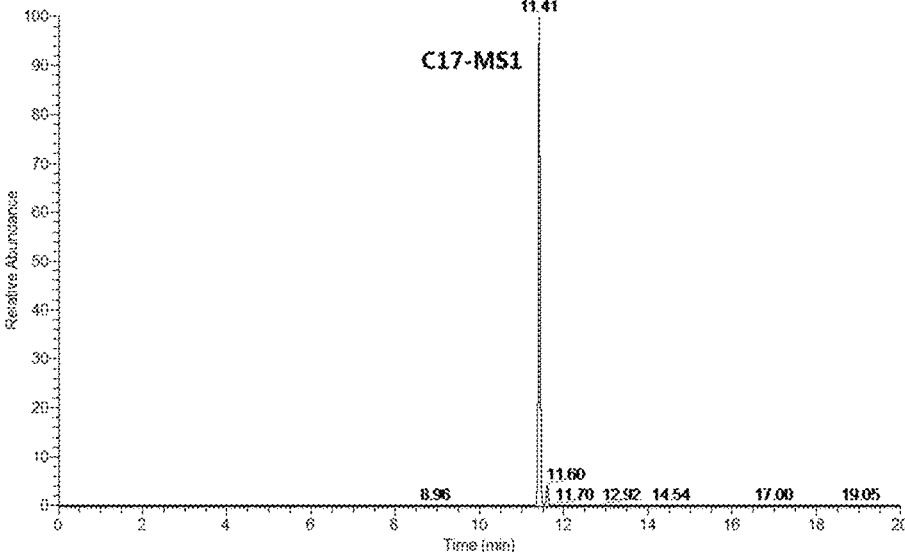
FIG. 17 is MS1 and MS2 mass spectrums of a compound C17 in Table 1.
Figure 17:
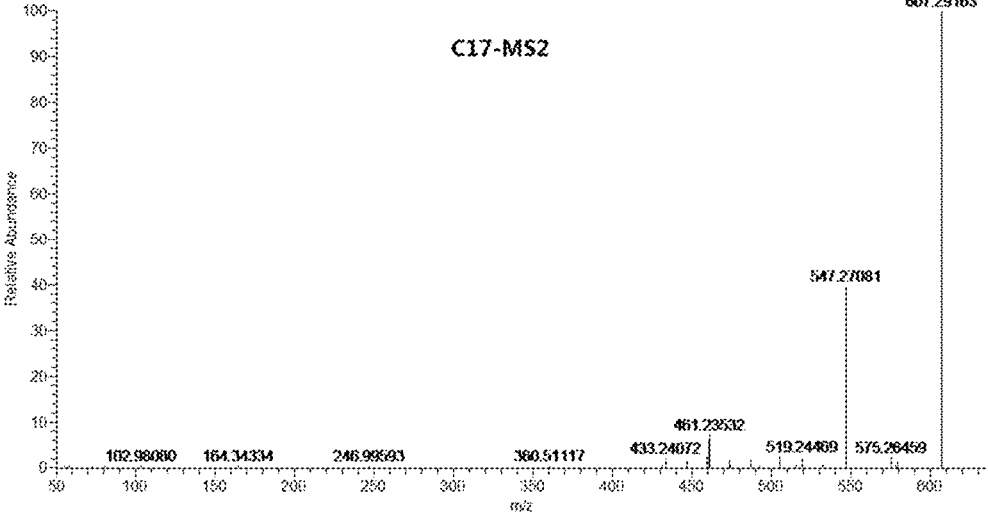
Figure 18:
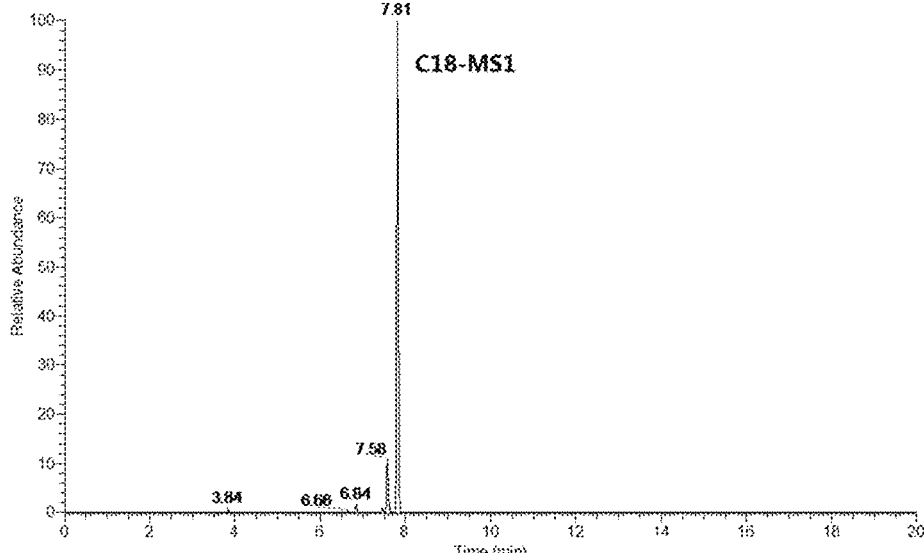
FIG. 18 is MS1 and MS2 mass spectrums of a compound C18 in Table 1.
Figure 18:
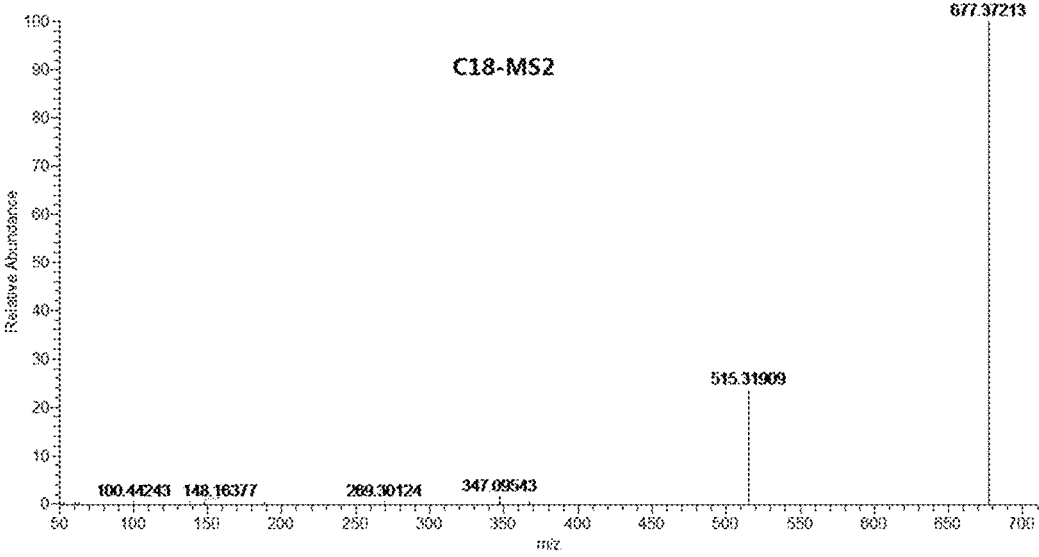
Figure 19:
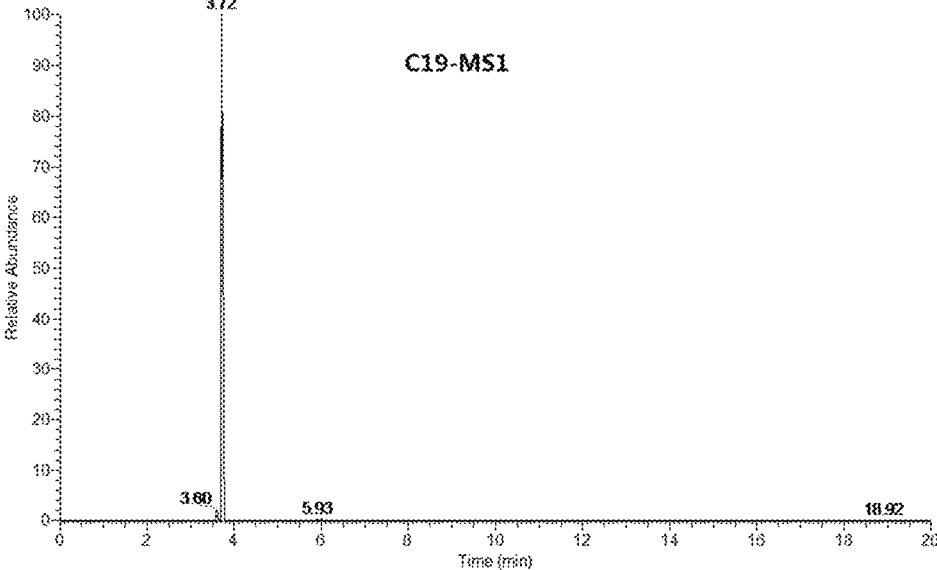
FIG. 19 is MS1 and MS2 mass spectrums of a compound C19 in Table 1.
Figure 19:
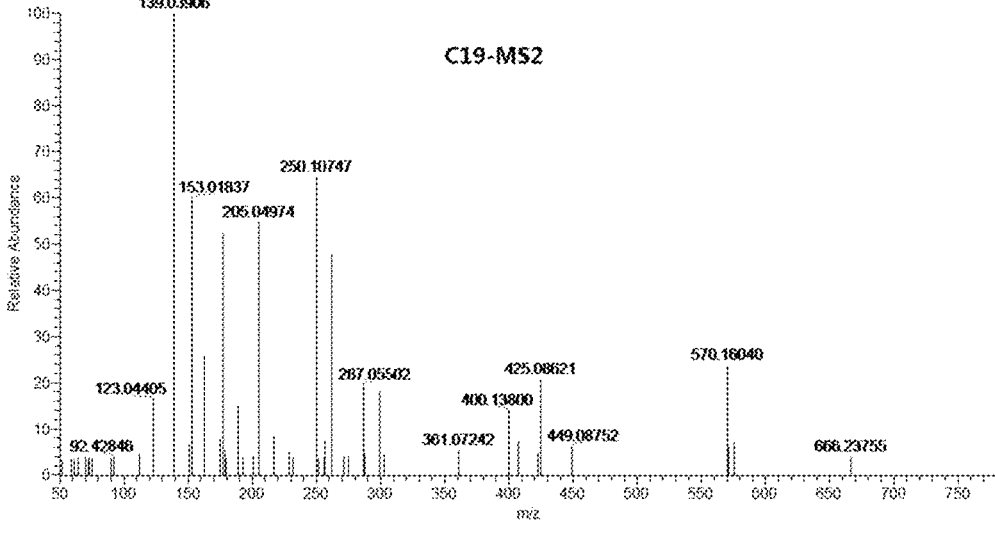
Figure 20:
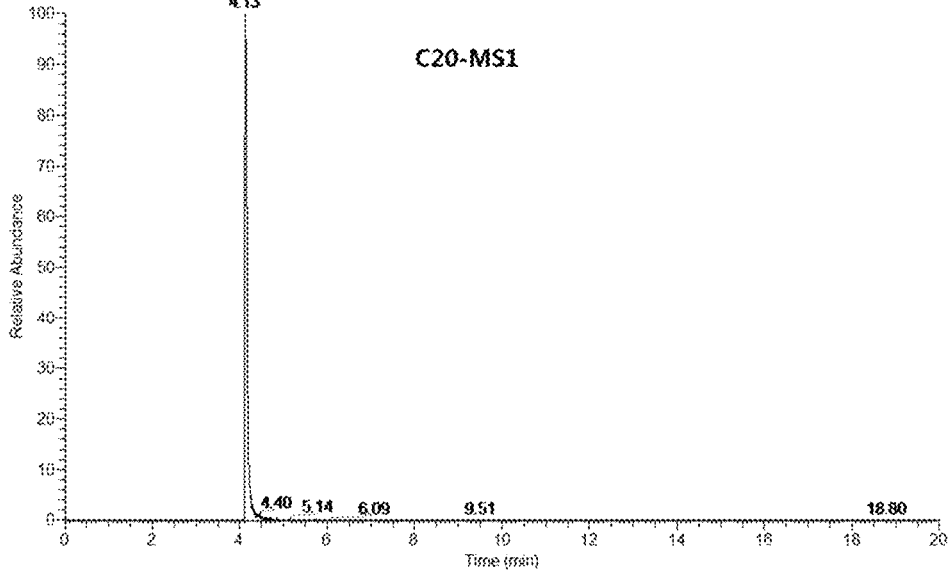
FIG. 20 is MS1 and MS2 mass spectrums of a compound C20 in Table 1.
Figure 20:
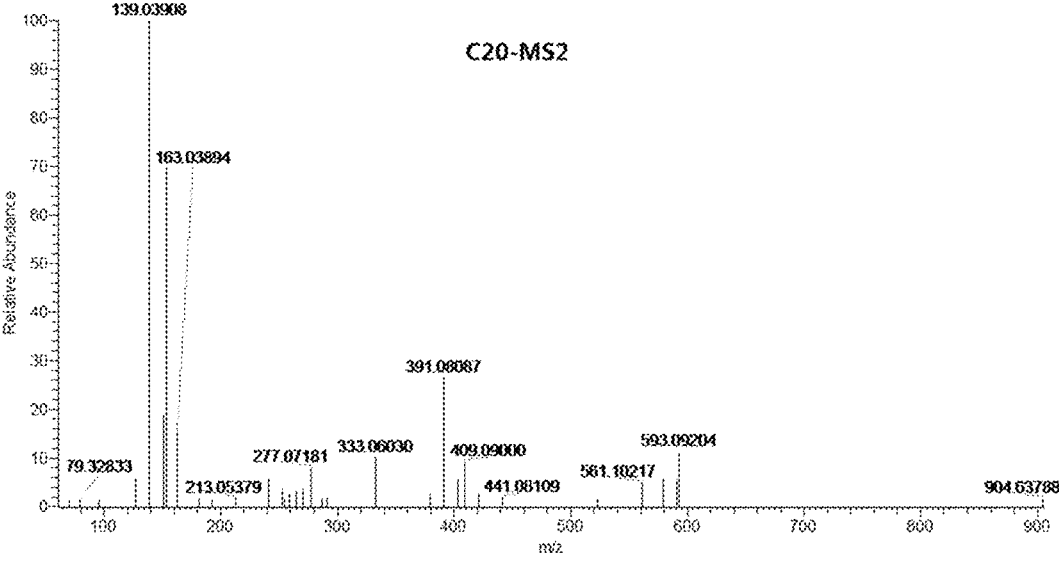
Figures 21, 22:
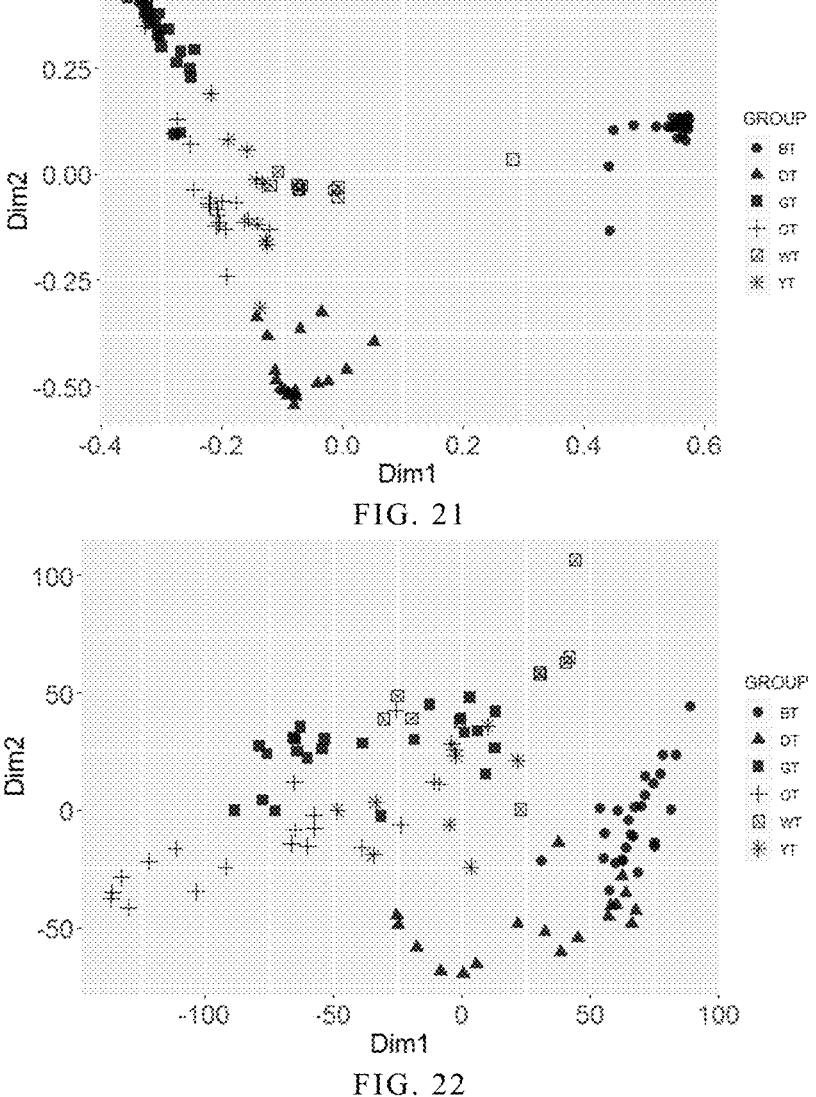
FIG. 21 is a training set sample data visual graphic of a tea type differentiation model based on a random forest algorithm according to Example 1 of the disclosure.
FIG. 22 is a training set sample data visual graphic of a tea type differentiation model based on a support vector machine algorithm according to Example 2 of the disclosure.
Figure 23:
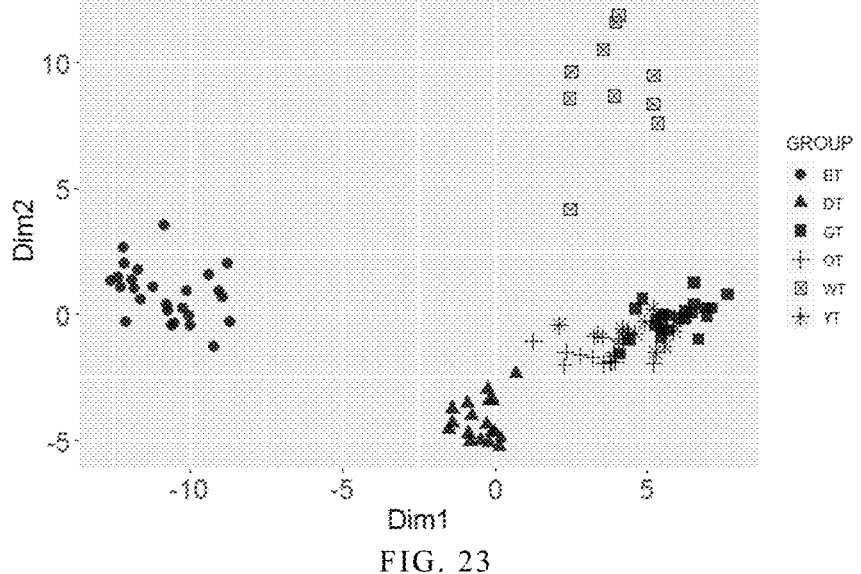
FIG. 23 is a training set sample data visual graphic of a tea type differentiation model based on a Fisher algorithm according to Example 3 of the disclosure, wherein BT is black tea, DT is dark green tea, GT is green tea, OT is oolong tea, WT is white tea, and YT is yellow tea.

Data obtained after normalization on different tea type samples was subjected to OPLS-DA, and then, variables with VIP values greater than 1.5 were selected as candidate variables. In order to further simplify the variables, the candidate variables were further selected by a stepwise discriminant analysis method to finally obtain 16 compounds. In combination with practical application conditions where it was discovered that green tea and yellow bud tea were easy to wrongly discriminate, in order to avoid potential differentiation rate reduction caused by sample increase in practical application, some characteristic variables beneficial to green tea and yellow bud tea differentiation were considered to be added. Through a parameter of FC (Fold Change) introduced, compound variables with FC>2, FC<0.5 and high intensity between green tea and yellow bud tea were selected, and 4 compounds were finally obtained through selection. The compounds obtained through twice selection were aggregated to finally obtain 20 compounds for discriminating different tea types. Specific information of each compound is shown in Table 1. The tea samples were detected through a detection platform. MS1 and MS2 mass spectrums of the 20 compounds obtained are shown in FIG. 1 to FIG. 20.

Step 4: Random allocation of samples to obtain a training set and a validation set. The 126 tea samples were randomly allocated according to a principle that a proportion of the quantity of each type of samples used as the training set to the quantity of each type of samples to be discriminated used as the validation set was not smaller than 3:1. The quantity of the samples to be discriminated used as the validation set was totally 20. The quantity of the model building samples used as the training set was totally 106.

Step 5: Model building and unknown sample prediction: A tea type differentiation model based on a random forest algorithm was obtained according to data of the 106 tea samples of the training set. Data of the training set samples was subjected to back substitution checking. The type differentiation results of all tea samples were correct, and the differentiation accuracy was 100%. The results are shown in Table 2. Identically, data of 20 tea samples to be discriminated were put into the model to obtain a confusion matrix of the tea type differentiation model based on the random forest algorithm for calculating the tea samples to be discriminated, the differentiation results of all tea samples were correct, and the differentiation accuracy was 100%.

TABLE 1

Information table of 20 compounds and internal
standard (DL-4-chlorophenylalanine)

| Compound No. | Mass-to-charge ratio | Retention time |
|---|---|---|
| Internal standard | 200.04724 | 3.601 |
| C1 | 116.0648-116.0764 | 0.772-0.872 |
| C2 | 267.1206-267.1474 | 3.271-3.371 |
| C3 | 268.0906-268.1174 | 1.066-1.166 |
| C4 | 280.1252-280.1532 | 0.796-0.896 |
| C5 | 289.0561-289.085 | 3.574-3.674 |
| C6 | 307.0657-307.0964 | 3.574-3.674 |
| C7 | 308.0757-308.1065 | 0.792-0.892 |
| C8 | 309.0814-309.1123 | 3.832-3.932 |
| C9 | 364.0819-364.1183 | 0.761-0.861 |
| C10 | 381.0604-381.0985 | 0.743-0.843 |
| C11 | 425.0658-425.1083 | 3.812-3.912 |
| C12 | 485.0833-485.1318 | 3.534-3.634 |
| C13 | 518.2984-518.3503 | 6.803-6.903 |
| C14 | 537.2765-537.3302 | 7.374-7.474 |
| C15 | 554.1509-554.2063 | 3.671-3.771 |
| C16 | 579.1207-579.1786 | 3.485-3.585 |
| C17 | 607.2611-607.3218 | 11.337-11.437 |
| C18 | 677.3378-677.4055 | 7.594-7.694 |
| C19 | 744.2234-744.2978 | 3.572-3.672 |
| C20 | 869.1124-869.1993 | 3.987-4.087 |

TABLE 2

| | | Actual type | | | | | | |
|---|---|---|---|---|---|---|---|---|
| | Prediction type | Black tea | Dark green tea | Green tea | Oolong tea | White tea | Yellow tea | Accuracy |
| Training set | Black tea | 26 | 0 | 0 | 0 | 0 | 0 | 100% |
| | Dark green tea | 0 | 18 | 0 | 0 | 0 | 0 | |
| | Green tea | 0 | 0 | 23 | 0 | 0 | 0 | |
| | Oolong tea | 0 | 0 | 0 | 19 | 0 | 0 | |
| | White tea | 0 | 0 | 0 | 0 | 10 | 0 | |
| | Yellow tea | 0 | 0 | 0 | 0 | 0 | 10 | |
| Test set | Black tea | 4 | 0 | 0 | 0 | 0 | 0 | 100% |
| | Dark green tea | 0 | 4 | 0 | 0 | 0 | 0 | |
| | Green tea | 0 | 0 | 4 | 0 | 0 | 0 | |
| | Oolong tea | 0 | 0 | 0 | 4 | 0 | 0 | |
| | White tea | 0 | 0 | 0 | 0 | 2 | 0 | |
| | Yellow tea | 0 | 0 | 0 | 0 | 0 | 2 | |

*differentiation results of random forest model*

Example 2: Tea Type Differentiation Method

Tea samples in Example 2 were the same as those in Example 1. Additionally, Steps 1 to 4 in Example 2 were implemented according to those in Example 1. Step 5: Model building and unknown sample prediction: According to data of the 106 tea samples of the training set, tea type differentiation models based on a support vector machine were obtained. Data of the training set samples was subjected to back substitution checking. The type differentiation results of all the tea samples were correct, and the differentiation accuracy was 100%. The results are as shown in Table 3. Identically, data of 20 tea samples to be discriminated were put into the model to obtain a confusion matrix of the tea type differentiation model based on a support vector machine for calculating the tea samples to be discriminated, the differentiation results of all the tea samples were correct, and the differentiation accuracy was 100%.

Example 3: Tea Type Differentiation Method

Tea samples in Example 3 were the same as those in Example 1. Additionally, Steps 1 to 4 in Example 3 were implemented according to those in Example 1. Step 5: Model building and unknown sample prediction: According to data of the 106 tea samples of the training set, tea type differentiation models based on a Fisher algorithm were obtained. Data of the training set samples was subjected to back substitution checking. The type differentiation results of all tea samples were correct, and the differentiation accuracy was 100%. The results are as shown in Table 4. Identically, the data of 20 tea samples to be discriminated were put into the model to obtain a confusion matrix of the tea type differentiation model based on a Fisher function for calculating the tea samples to be discriminated, the differentiation results of all the tea samples were correct, and the differentiation accuracy was 100%.

TABLE 3

| | | Actual type | | | | | | |
|---|---|---|---|---|---|---|---|---|
| | Prediction type | Black tea | Dark green tea | Green tea | Oolong tea | White tea | Yellow tea | Accuracy |
| Training set | Black tea | 26 | 0 | 0 | 0 | 0 | 0 | 100% |
| | Dark green tea | 0 | 18 | 0 | 0 | 0 | 0 | |
| | Green tea | 0 | 0 | 23 | 0 | 0 | 0 | |
| | Oolong tea | 0 | 0 | 0 | 19 | 0 | 0 | |
| | White tea | 0 | 0 | 0 | 0 | 10 | 0 | |
| | Yellow tea | 0 | 0 | 0 | 0 | 0 | 10 | |
| Test set | Black tea | 4 | 0 | 0 | 0 | 0 | 0 | 100% |
| | Dark green tea | 0 | 4 | 0 | 0 | 0 | 0 | |
| | Green tea | 0 | 0 | 4 | 0 | 0 | 0 | |
| | Oolong tea | 0 | 0 | 0 | 4 | 0 | 0 | |
| | White tea | 0 | 0 | 0 | 0 | 2 | 0 | |
| | Yellow tea | 0 | 0 | 0 | 0 | 0 | 2 | |

*differentiation results of support vector machine model*

TABLE 4

| | | Actual type | | | | | | |
|---|---|---|---|---|---|---|---|---|
| | Prediction type | Black tea | Dark green tea | Green tea | Oolong tea | White tea | Yellow tea | Accuracy |
| Training set | Black tea | 26 | 0 | 0 | 0 | 0 | 0 | 100% |
| | Dark green tea | 0 | 18 | 0 | 0 | 0 | 0 | |
| | Green tea | 0 | 0 | 23 | 0 | 0 | 0 | |
| | Oolong tea | 0 | 0 | 0 | 19 | 0 | 0 | |
| | White tea | 0 | 0 | 0 | 0 | 10 | 0 | |
| | Yellow tea | 0 | 0 | 0 | 0 | 0 | 10 | |
| Test set | Black tea | 4 | 0 | 0 | 0 | 0 | 0 | 100% |
| | Dark green tea | 0 | 4 | 0 | 0 | 0 | 0 | |
| | Green tea | 0 | 0 | 4 | 0 | 0 | 0 | |
| | Oolong tea | 0 | 0 | 0 | 4 | 0 | 0 | |
| | White tea | 0 | 0 | 0 | 0 | 2 | 0 | |
| | Yellow tea | 0 | 0 | 0 | 0 | 0 | 2 | |

Classification results of Fisher linear differentiation model

Example 4

This example provides a tea classification system, including:

a sampling module, configured to obtain tea mass spectrometric data corresponding to tea to be discriminated by using an LC-MS technology; and a classification module, configured to build a differentiation function by using ironic intensities of 20 characteristic compounds as evaluation indexes to perform classification processing on the obtained tea mass spectrometric data for obtaining a classification result of the tea to be discriminated. Mass-to-charge ratios of the 20 compounds are as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-537.3302, 554.1509-554.2063, 579.1207-579.1786, 607.2611-607.3218, 677.3378-677.4055, 744.2234-744.2978, and 869.1124-869.1993.

Further, the system further includes a model building module configured to build tea classification models. The model building module specifically includes:

a model building data obtaining submodule, configured to obtain sample tea mass spectrometric data corresponding to different types of sample tea and use a data set formed by the obtained sample tea mass spectrometric data as a sample tea mass spectrometric data set;

a model building processing submodule, configured to randomly divide the obtained sample tea mass spectrometric data into a training set and a validation set, and perform model building processing on the training set by using a random forest method, a support vector machine method or a Fisher differentiation method to build and obtain tea type differentiation models; and a validation submodule, configured to validate a random forest model by using the validation set.

Example 5

This example provides an automatic tea separation device, including the tea classification system of Example 4 and configured to classify the tea according to the tea classification system.

Comparative Example 1

16 Compounds (277.0692, 112.0753, 116.0702, 104.0703, 181.1217, 679.4144, 333.2024, 132.1014, 381.078, 267.1328, 335.218, 175.1071, 496.3372, 291.0854, 433.1109, and 535.2675) in patents CN201810521854 and CN201810521734 were used, the 106 tea samples in Examples 1 to 3 were used to build three models, and 20 tea samples were used to check differentiation accuracy of the models. In order to compare the prediction capabilities of two kinds of variable combinations on 126 tea samples, the same training set samples and test set samples were used.

differentiation results of the random forest model are as shown in Table 5. From data of the training set samples, the 106 tea samples were all correctly discriminated, and the accuracy of the whole model was 100%. From the differentiation results of the 20 test set samples, the dark green tea, oolong tea, white tea and yellow tea samples were all correctly discriminated. One black tea sample was wrongly discriminated as white tea, one green tea sample was wrongly discriminated as yellow tea, and the differentiation accuracy of this model on data of the test set samples was 90%.

TABLE 5

| | | Actual type | | | | | | |
|---|---|---|---|---|---|---|---|---|
| | Prediction type | Black tea | Dark green tea | Green tea | Oolong tea | White tea | Yellow tea | Accuracy |
| Training set | Black tea | 26 | 0 | 0 | 0 | 0 | 0 | 100% |
| | Dark green tea | 0 | 18 | 0 | 0 | 0 | 0 | |
| | Green tea | 0 | 0 | 23 | 0 | 0 | 0 | | differentiation results of random forest model

TABLE 5-continued

| | | Actual type | | | | | | |
|---|---|---|---|---|---|---|---|---|
| | | differentiation results of random forest model | | | | | | |
| | Prediction type | Black tea | Dark green tea | Green tea | Oolong tea | White tea | Yellow tea | Accuracy |
|---|---|---|---|---|---|---|---|---|
| | Oolong tea | 0 | 0 | 0 | 19 | 0 | 0 | |
| | White tea | 0 | 0 | 0 | 0 | 10 | 0 | |
| | Yellow tea | 0 | 0 | 0 | 0 | 0 | 10 | |
| Test | Black tea | 3 | 0 | 0 | 0 | 0 | 0 | 90% |
| set | Dark green tea | 0 | 4 | 0 | 0 | 0 | 0 | |
| | Green tea | 0 | 0 | 3 | 0 | 0 | 0 | |
| | Oolong tea | 0 | 0 | 0 | 4 | 0 | 0 | |
| | White tea | 1 | 0 | 0 | 0 | 2 | 0 | |
| | Yellow tea | 0 | 0 | 1 | 0 | 0 | 2 | | differentiation results of the support vector machine model are as shown in Table 6. From data of the training set samples, only two yellow tea samples were wrongly discriminated as green tea samples, other tea type samples were all correctly discriminated, and the accuracy of the whole model was finally 98.11%. From the differentiation results of the 20 test set samples, the dark green tea, green tea, oolong tea and white tea samples were all correctly discriminated. One black tea sample was wrongly discriminated as white tea, two yellow tea samples were both wrongly discriminated as green tea, and the differentiation accuracy of this model on data of the test set samples was 85%.

TABLE 6

| | | Actual type | | | | | | |
|---|---|---|---|---|---|---|---|---|
| | | differentiation results of support vector machine model | | | | | | |
| | Prediction type | Black tea | Dark green tea | Green tea | Oolong tea | White tea | Yellow tea | Accuracy |
|---|---|---|---|---|---|---|---|---|
| Training | Black tea | 26 | 0 | 0 | 0 | 0 | 0 | 98.11% |
| set | Dark green tea | 0 | 18 | 0 | 0 | 0 | 0 | |
| | Green tea | 0 | 0 | 23 | 0 | 0 | 2 | |
| | Oolong tea | 0 | 0 | 0 | 19 | 0 | 0 | |
| | White tea | 0 | 0 | 0 | 0 | 10 | 0 | |
| | Yellow tea | 0 | 0 | 0 | 0 | 0 | 8 | |
| Test | Black tea | 3 | 0 | 0 | 0 | 0 | 0 | 85% |
| set | Dark green tea | 0 | 4 | 0 | 0 | 0 | 0 | |
| | Green tea | 0 | 0 | 4 | 0 | 0 | 2 | |
| | Oolong Tea | 0 | 0 | 0 | 4 | 0 | 0 | |
| | White tea | 1 | 0 | 0 | 0 | 2 | 0 | |
| | Yellow tea | 0 | 0 | 0 | 0 | 0 | 0 | |

Classification results of the Fisher linear differentiation model are as shown in Table 7. From data of the training set samples, two black tea samples were wrongly discriminated as dark green tea and white tea, two oolong tea samples were wrongly discriminated as green tea, three yellow tea samples were wrongly discriminated as green tea, other tea type samples were all correctly discriminated, and the accuracy of the whole model was finally 93.4%. From the differentiation results of the 20 test set samples, the black tea, dark green tea, green tea and white tea samples were all correctly discriminated. One oolong tea sample was wrongly discriminated as green tea, one yellow tea sample was wrongly discriminated as oolong tea, and the differentiation accuracy of this model on data of the test set samples was 90%.

TABLE 7

| | | Actual type | | | | | | |
|---|---|---|---|---|---|---|---|---|
| | | Classification results of Fisher linear differentiation model | | | | | | |
| | Prediction type | Black tea | Dark green tea | Green tea | Oolong tea | White tea | Yellow tea | Accuracy |
|---|---|---|---|---|---|---|---|---|
| Training | Black tea | 24 | 0 | 0 | 0 | 0 | 0 | 93.4% |
| set | Dark green tea | 1 | 18 | 0 | 0 | 0 | 0 | |
| | Green tea | 0 | 0 | 23 | 2 | 0 | 3 | |

TABLE 7-continued

| | | Actual type | | | | | | |
|---|---|---|---|---|---|---|---|---|
| | Prediction type | Black tea | Dark green tea | Green tea | Oolong tea | White tea | Yellow tea | Accuracy |
| | Oolong tea | 0 | 0 | 0 | 17 | 0 | 0 | |
| | White tea | 1 | 0 | 0 | 0 | 10 | 0 | |
| | Yellow tea | 0 | 0 | 0 | 0 | 0 | 7 | |
| Test set | Black tea | 4 | 0 | 0 | 0 | 0 | 0 | 90% |
| | Dark green tea | 0 | 4 | 0 | 0 | 0 | 0 | |
| | Green tea | 0 | 0 | 4 | 1 | 0 | 0 | |
| | Oolong tea | 0 | 0 | 0 | 3 | 0 | 1 | |
| | White tea | 0 | 0 | 0 | 0 | 2 | 0 | |
| | Yellow tea | 0 | 0 | 0 | 0 | 0 | 1 | |

Classification results of Fisher linear differentiation model

From the differentiation results of the three above models, the 16 compounds were used for the differentiation of 126 tea samples, the accuracy was not higher than the differentiation accuracy of a variable combination using 20 compounds. By comparison, the combination of the 20 compounds could better represent the characteristic compounds of the six major tea types, and play an important role in the differentiation of each tea type.

Comparative Example 2

In order to further prove the differentiation effects of the 20 compounds on different tea types, parts of compounds were omitted/added/replaced to prove that a similar effect cannot be achieved by a combination of various random compounds. Different differentiation models were built by taking a Fisher algorithm as an example, and illumination is provided by comparing their differentiation results.

1. Parts of Compounds were Omitted 4 compounds (C17-C20) were randomly deleted from the 20 compounds. For the rest 16 compounds, the 106 tea samples in Examples 1 to 3 were used to build a Fisher linear differentiation model, and the differentiation accuracy of the model was checked by using 20 tea samples. The differentiation results are as shown in Table 8. From data of the training set samples, one oolong tea sample and one white tea sample were wrongly discriminated as green tea, other tea type samples were all correctly discriminated, and the differentiation accuracy on the training set samples was 98.11%. In the test set samples, one black tea sample was wrongly discriminated as dark green tea, the differentiation accuracy of the model on the test set sample was 95%. By comparison to a Fisher linear differentiation model built after deleting parts of compounds, the 20 compounds before detection showed better differentiation effects, and the differentiation accuracy was higher.

TABLE 8

Classification results of Fisher linear differentiation model

| | | Actual type | | | | | | |
|---|---|---|---|---|---|---|---|---|
| | Prediction type | Black tea | Dark green tea | Green tea | Oolong tea | White tea | Yellow tea | Accuracy |
| Training set | Black tea | 26 | 0 | 0 | 0 | 0 | 0 | 98.11% |
| | Dark green tea | 0 | 18 | 0 | 0 | 0 | 0 | |
| | Green tea | 0 | 0 | 23 | 1 | 1 | 0 | |
| | Oolong tea | 0 | 0 | 0 | 18 | 0 | 0 | |
| | White tea | 0 | 0 | 0 | 0 | 9 | 0 | |
| | Yellow tea | 0 | 0 | 0 | 0 | 0 | 10 | |
| Test set | Black tea | 3 | 0 | 0 | 0 | 0 | 0 | 95% |
| | Dark green tea | 1 | 4 | 0 | 0 | 0 | 0 | |
| | Green tea | 0 | 0 | 4 | 0 | 0 | 0 | |
| | Oolong tea | 0 | 0 | 0 | 4 | 0 | 0 | |
| | White tea | 0 | 0 | 0 | 0 | 2 | 0 | |
| | Yellow tea | 0 | 0 | 0 | 0 | 0 | 2 | |

2. Parts of Compounds were Added

Parts of compounds were additionally added to a variable combination of 20 compounds. Main secondary metabolic compounds in tea, including the following four types: theanine (MZ: 175.10772), caffeine (MZ: 195.08765), epicatechin (MZ: 291.08631) and epigallocatechin gallate (MZ: 459.09219) were selected. Identically, 106 tea samples in Examples 1 to 3 were used to build a Fisher linear differentiation model, the differentiation accuracy of the model was checked by using 20 tea samples, and the result comparability was ensured. The Fisher linear differentiation model was built by the 20 compounds obtained by replacement. The differentiation results are as shown in Table 9. From data of training set samples, only one oolong tea sample was wrongly discriminated as green tea, other tea types were all correctly discriminated, and the differentiation accuracy on the training set samples was 99.06%. From test set samples, one green tea sample was wrongly discriminated as oolong tea, other tea types were all correctly discriminated, and the differentiation accuracy of the test set samples was 95%. By comparison to the Fisher linear differentiation model built after adding parts of compounds, 20 compounds before compound addition showed better differentiation effects, and the differentiation accuracy was higher.

discriminated, and the differentiation accuracy on the training set samples was 98.11%. In the test set samples, one oolong tea sample was wrongly discriminated as green tea, and the differentiation accuracy of the model on the test set samples was 95%. By comparison to the Fisher linear differentiation model built by replacing parts of compounds, the 20 compounds before replacement showed better differentiation effects, and the differentiation accuracy was better.

TABLE 9

Classification results of Fisher linear differentiation model

| | | Actual type | | | | | | |
| | Prediction type | Black tea | Dark green tea | Green tea | Oolong tea | White tea | Yellow tea | Accuracy |
|---|---|---|---|---|---|---|---|---|
| Training set | Black tea | 26 | 0 | 0 | 0 | 0 | 0 | 99.06% |
| | Dark green tea | 0 | 18 | 0 | 0 | 0 | 0 | |
| | Green tea | 0 | 0 | 23 | 1 | 0 | 0 | |
| | Oolong tea | 0 | 0 | 0 | 18 | 0 | 0 | |
| | White tea | 0 | 0 | 0 | 0 | 10 | 0 | |
| | Yellow tea | 0 | 0 | 0 | 0 | 0 | 10 | |
| Test set | Black tea | 4 | 0 | 0 | 0 | 0 | 0 | 95% |
| | Dark green tea | 0 | 4 | 0 | 0 | 0 | 0 | |
| | Green tea | 0 | 0 | 3 | 0 | 0 | 0 | |
| | Oolong tea | 0 | 0 | 1 | 4 | 0 | 0 | |
| | White tea | 0 | 0 | 0 | 0 | 2 | 0 | |
| | Yellow tea | 0 | 0 | 0 | 0 | 0 | 2 | |

3. Parts of Compounds were Replaced 4 compounds C17-C20 were randomly selected from the 20 compounds and were replaced with main secondary

TABLE 10

Classification results of Fisher linear differentiation model

| | | Actual type | | | | | | |
| | Prediction type | Black tea | Dark green tea | Green tea | Oolong tea | White tea | Yellow tea | Accuracy |
|---|---|---|---|---|---|---|---|---|
| Training set | Black tea | 26 | 0 | 0 | 0 | 0 | 0 | 98.11% |
| | Dark green tea | 0 | 18 | 0 | 0 | 0 | 0 | |
| | Green tea | 0 | 0 | 23 | 1 | 1 | 0 | |
| | Oolong tea | 0 | 0 | 0 | 18 | 0 | 0 | |
| | White tea | 0 | 0 | 0 | 0 | 9 | 0 | |
| | Yellow tea | 0 | 0 | 0 | 0 | 0 | 10 | |
| Test set | Black tea | 4 | 0 | 0 | 0 | 0 | 0 | 95% |
| | Dark green tea | 0 | 4 | 0 | 0 | 0 | 0 | |
| | Green tea | 0 | 0 | 4 | 1 | 0 | 0 | |
| | Oolong tea | 0 | 0 | 0 | 3 | 0 | 0 | |
| | White tea | 0 | 0 | 0 | 0 | 2 | 0 | |
| | Yellow tea | 0 | 0 | 0 | 0 | 0 | 2 | | metabolic compounds of theanine (MZ: 175.10772), caffeine (MZ: 195.08765), epicatechin (MZ: 291.08631) and epigallocatechin gallate (MZ: 459.09219) in tea. Identically, 106 tea samples in Examples 1-3 were used to build a Fisher linear differentiation model, the differentiation accuracy of the model was checked by 20 tea samples, and the result comparability is ensured. The Fisher linear differentiation model was built by the 20 compounds obtained after replacement. The differentiation results are as shown in Table 10. From data of the training set samples, one oolong tea sample and one white tea sample were wrongly discriminated as green tea, other tea type samples were all correctly Based on the above, parts of compounds were deleted/added/replaced as comparison, according to the differentiation results of the built Fisher linear differentiation model on the training set and test set samples, it was discovered that a differentiation effect of the 20 selected compounds cannot be achieved by a combination of various random compounds, and the combination of the 20 compounds play an important role in the differentiation of different tea types.

Exemplary examples of the disclosure described above are disclosed for purposes of illustration and are not intended to be limiting. Those skilled in the art may make various changes and modifications without departing from the scope and spirit of the disclosure. Therefore, the protection scope of the disclosure should be as set forth in the claims.

What is claimed is:

1. A tea type differentiation method, comprising: building a differentiation function by using ionic strengths of 20 compounds as evaluation indexes to differentiate tea types, wherein mass-to-charge ratios of the 20 compounds being as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-537.3302, 554.1509-554.2063, 579.1207-579.1786, 607.2611-607.3218, 677.3378-677.4055, 744.2234-744.2978, and 869.1124-869.1993; wherein, for the 20 compounds, different tea type sample data is subjected to OPLS-DA, then, variables with VIP (Variable Importance in Projection) values greater than 1.5 are selected as candidate variables, and the candidate variables are further selected by a stepwise discriminant analysis method to finally obtain 16 compounds; further, through a parameter of FC (Fold Change) introduced, compound variables with FC>2, FC<0.5 and high ironic response intensity between green tea and yellow bud tea are selected, and 4 compounds are finally obtained through selection; and the compounds obtained through twice selection are aggregated to finally obtain 20 compounds for discriminating different tea types.

2. The tea type differentiation method according to claim 1, specifically comprising:

(1) performing preprocessing on tea samples, wherein the preprocessing comprises grinding the tea samples into powder, performing centrifugation to obtain a supernatant, and setting an internal standard;

(2) detecting the tea samples to obtain each group of data matrixes comprising peak area, retention time and mass-to-charge ratio information of each of the samples, performing internal standard normalization by respectively dividing an ionic response intensity value of an obtained compound peak by an internal standard compound ionic response intensity value, and performing variable selection through OPLS-DA (Orthogonal Partial Least-Squares Discriminant Analysis) and stepwise discriminant analysis to obtain 20 characteristic compounds;

(3) building tea type differentiation models by using internal standard normalization ionic response intensity values of the 20 compounds obtained from the tea samples; and (4) putting the internal standard normalization ionic response intensity values of the 20 compounds in tea samples to be differentiated into the built tea type differentiation models to obtain the types of the tea samples to be differentiated.

3. The tea type differentiation method according to claim 1, wherein, before the putting the internal standard normalization ionic response intensity values of the tea samples to be differentiated into different built tea type differentiation models, the method further comprises: collecting tea samples of each type, preprocessing and detecting the samples, processing and analyzing obtained data, and obtaining the internal standard normalization ionic response intensity values of the 20 compounds of the samples between the set mass-to-charge ratios.

4. The tea type differentiation method according to claim 1, mathematical methods for building the tea type differentiation models comprise a random forest method, a support vector machine method or a Fisher differentiation method.

5. The tea type differentiation method according to claim 1, wherein the building different tea type differentiation models further comprises: using data of the internal standard normalization ionic response intensity values of 20 compounds of different types of collected tea samples between the set mass-to-charge ratios as a data set of sample tea; and randomly dividing the data set of the sample tea into a training set and a validation set, wherein data of the training set is used for building the tea type differentiation models, data of the validation set is used for validating the built tea type differentiation models, and a ratio of the quantity of the sample tea samples of each tea type to the quantity of the tea samples to be differentiated is not smaller than 3:1.

6. The tea type differentiation method according to claim 1, wherein, according to the different built tea type differentiation models, the tea samples to be differentiated are detected to obtain data of the internal standard normalization ionic response intensity values of 20 compounds between the set mass-to-charge ratios, the data is put into the built tea type differentiation models to obtain a classification result of the tea samples to be differentiated.

7. The tea type differentiation method according to claim 1, wherein the tea types comprise one or more of green tea, yellow tea, dark green tea, white tea, black tea and oolong tea.

8. A tea classification system, comprising:

a sampling module, configured to obtain tea mass spectrometric data corresponding to tea to be differentiated by using an LC-MS (Liquid Chromatography-Mass Spectrometry) technology;

a classification module, configured to build a differentiation function by using ironic intensities of 20 characteristic compounds as evaluation indexes to perform classification processing on the obtained tea mass spectrometric data for obtaining a classification result of the tea to be differentiated, mass-to-charge ratios of the 20 compounds being as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-537.3302, 554.1509-554.2063, 579.1207-579.1786, 607.2611-607.3218, 677.3378-677.4055, 744.2234-744.2978, and 869.1124-869.1993;

a model building module configured to build tea classification models, wherein the model building module specifically comprises: a model building data obtaining submodule, configured to obtain sample tea mass spectrometric data corresponding to different types of sample tea and use a data set formed by the obtained sample tea mass spectrometric data as a sample tea mass spectrometric data set;

a model building processing submodule, configured to randomly divide the obtained sample tea mass spectrometric data into a training set and a validation set, and perform model building processing on the training set by using a random forest method, a support vector machine method or a Fisher differentiation method to build and obtain tea type differentiation models; and a validation submodule, configured to validate a random forest model by using the validation set.

9. An automatic tea separation device, comprising the tea classification system according to claim 8.

10. A tea type differentiation method, comprising: building a differentiation function by using ionic strengths of 20 compounds as evaluation indexes to differentiate tea types, wherein mass-to-charge ratios of the 20 compounds being as follows: 116.0648-116.0764, 267.1206-267.1474, 268.0906-268.1174, 280.1252-280.1532, 289.0561-289.085, 307.0657-307.0964, 308.0757-308.1065, 309.0814-309.1123, 364.0819-364.1183, 381.0604-381.0985, 425.0658-425.1083, 485.0833-485.1318, 518.2984-518.3503, 537.2765-537.3302, 554.1509-554.2063, 579.1207-579.1786, 607.2611-607.3218, 677.3378-677.4055, 744.2234-744.2978, and 869.1124-869.1993; wherein the building different tea type differentiation models further comprises: using data of the internal standard normalization ionic response intensity values of 20 compounds of different types of collected tea samples between the set mass-to-charge ratios as a data set of sample tea; and randomly dividing the data set of the sample tea into a training set and a validation set, wherein data of the training set is used for building the tea type differentiation models, data of the validation set is used for validating the built tea type differentiation models, and a ratio of the quantity of the sample tea samples of each tea type to the quantity of the tea samples to be differentiated is not smaller than 3:1.

11. The tea type differentiation method according to claim 10, specifically comprising:

(1) performing preprocessing on tea samples, wherein the preprocessing comprises grinding the tea samples into powder, performing centrifugation to obtain a supernatant, and setting an internal standard;

(2) detecting the tea samples to obtain each group of data matrixes comprising peak area, retention time and mass-to-charge ratio information of each of the samples, performing internal standard normalization by respectively dividing an ionic response intensity value of an obtained compound peak by an internal standard compound ionic response intensity value, and performing variable selection through OPLS-DA (Orthogonal Partial Least-Squares Discriminant Analysis) and stepwise discriminant analysis to obtain 20 characteristic compounds;

(3) building tea type differentiation models by using internal standard normalization ionic response intensity values of the 20 compounds obtained from the tea samples; and (4) putting the internal standard normalization ionic response intensity values of the 20 compounds in tea samples to be differentiated into the built tea type differentiation models to obtain the types of the tea samples to be differentiated.

12. The tea type differentiation method according to claim 10, wherein, before the putting the internal standard normalization ionic response intensity values of the tea samples to be differentiated into different built tea type differentiation models, the method further comprises: collecting tea samples of each type, preprocessing and detecting the samples, processing and analyzing obtained data, and obtaining the internal standard normalization ionic response intensity values of the 20 compounds of the samples between the set mass-to-charge ratios.

13. The tea type differentiation method according to claim 10, wherein, for the 20 compounds, different tea type sample data is subjected to OPLS-DA, then, variables with VIP (Variable Importance in Projection) values greater than 1.5 are selected as candidate variables, and the candidate variables are further selected by a stepwise discriminant analysis method to finally obtain 16 compounds; further, through a parameter of FC (Fold Change) introduced, compound variables with FC>2, FC<0.5 and high ironic response intensity between green tea and yellow bud tea are selected, and 4 compounds are finally obtained through selection; and the compounds obtained through twice selection are aggregated to finally obtain 20 compounds for discriminating different tea types.

14. The tea type differentiation method according to claim 10, wherein, mathematical methods for building the tea type differentiation models comprise a random forest method, a support vector machine method or a Fisher differentiation method.

15. The tea type differentiation method according to claim 10, wherein, according to the different built tea type differentiation models, the tea samples to be differentiated are detected to obtain data of the internal standard normalization ionic response intensity values of 20 compounds between the set mass-to-charge ratios, the data is put into the built tea type differentiation models to obtain a classification result of the tea samples to be differentiated.

16. The tea type differentiation method according to claim 10, wherein the tea types comprise one or more of green tea, yellow tea, dark green tea, white tea, black tea and oolong tea.

* * * * *